(12) United States Patent
Simmons et al.

(10) Patent No.: US 7,736,738 B2
(45) Date of Patent: Jun. 15, 2010

(54) COATED MINING BOLT

(75) Inventors: Walter John Simmons, Martinsburg, WV (US); Walter Neal Simmons, Durham, NC (US)

(73) Assignee: Terrasimco Inc., Martinsburg, WV (US)

( * ) Notice: Subject to any disclaimer, the term of this patent is extended or adjusted under 35 U.S.C. 154(b) by 635 days.

(21) Appl. No.: 11/012,265

(22) Filed: Dec. 16, 2004

(65) Prior Publication Data

US 2005/0134104 A1 Jun. 23, 2005

Related U.S. Application Data

(60) Provisional application No. 60/529,736, filed on Dec. 17, 2003, provisional application No. 60/529,750, filed on Dec. 17, 2003, provisional application No. 60/548,183, filed on Mar. 1, 2004.

(51) Int. Cl.
*B32B 15/00* (2006.01)
*D02G 3/00* (2006.01)

(52) U.S. Cl. .................. 428/375; 428/379; 428/363; 428/401; 299/31; 405/288

(58) Field of Classification Search ................ 428/375, 428/379, 383, 401; 299/31; 405/288
See application file for complete search history.

(56) References Cited

U.S. PATENT DOCUMENTS

| | | | | |
|---|---|---|---|---|
| 3,324,662 A | 6/1967 | McLean | ......................... | 61/35 |
| 3,394,527 A | 7/1968 | McLean | ...................... | 52/741 |
| 3,491,497 A | 1/1970 | Bauer | ........................... | 52/166 |
| 3,805,533 A | 4/1974 | Askey et al. | ................. | 61/45 B |
| 3,859,780 A | 1/1975 | Brown | ......................... | 57/162 |
| 3,861,522 A | 1/1975 | Llewellyn et al. | ........... | 206/219 |
| 3,925,996 A * | 12/1975 | Wiggill | .................... | 405/259.6 |
| 3,936,924 A | 2/1976 | Ichise et al. | .................... | 29/427 |
| 3,971,177 A | 7/1976 | Endo | ............................ | 52/166 |
| 4,124,983 A | 11/1978 | Weatherby | .................. | 405/260 |
| 4,140,428 A | 2/1979 | McLain et al. | ............... | 405/261 |
| 4,162,133 A | 7/1979 | Clark et al. | .................. | 405/258 |
| 4,179,861 A | 12/1979 | Brown | ......................... | 52/743 |
| 4,239,105 A | 12/1980 | Gilbert | ........................ | 206/219 |
| 4,247,224 A | 1/1981 | Killmeyer | ................... | 405/260 |
| 4,302,131 A | 11/1981 | Brown | ......................... | 405/260 |
| 4,307,137 A | 12/1981 | Ota et al. | ...................... | 428/35 |
| 4,307,979 A | 12/1981 | Killmeyer | ................... | 405/259 |
| 4,369,003 A | 1/1983 | Brandstetter | ................ | 405/260 |
| 4,413,930 A | 11/1983 | Calandra, Jr. | ............... | 405/261 |
| 4,419,805 A | 12/1983 | Calandra, Jr. | ............... | 29/458 |
| 4,440,526 A | 4/1984 | Koppers et al. | .............. | 405/260 |
| 4,490,074 A | 12/1984 | Chaiko | ........................ | 405/259 |
| 4,516,885 A | 5/1985 | Calandra, Jr. | ............... | 405/261 |
| 4,518,283 A | 5/1985 | Gebauer et al. | ............. | 405/260 |
| 4,518,292 A | 5/1985 | Calandra, Jr. | ................ | 411/82 |
| 4,564,315 A | 1/1986 | Rozanc | ....................... | 405/261 |
| 4,664,555 A | 5/1987 | Herbst | ......................... | 405/260 |
| 4,746,248 A | 5/1988 | Lillis et al. | .................. | 405/260 |
| 4,764,055 A | 8/1988 | Clark et al. | .................. | 405/261 |
| 4,787,186 A | 11/1988 | Irmscher et al. | ............ | 52/309.3 |
| 4,836,729 A | 6/1989 | Bisping et al. | ................ | 411/82 |
| 4,840,524 A | 6/1989 | Bisping et al. | ................ | 411/82 |
| 4,865,489 A | 9/1989 | Stankus et al. | .............. | 405/261 |
| 4,955,758 A | 9/1990 | Hyde | .......................... | 405/261 |
| 4,958,961 A | 9/1990 | Herbst et al. | ................ | 405/260 |
| 4,971,493 A | 11/1990 | Herbst et al. | .................... | 411/5 |
| 5,064,311 A | 11/1991 | Giroux et al. | ............ | 405/259.1 |
| 5,064,312 A | 11/1991 | Calandra, Jr. et al. | .... | 405/259.5 |
| 5,082,399 A | 1/1992 | Frease et al. | ............. | 405/259.6 |
| 5,152,649 A | 10/1992 | Popp | ........................... | 411/55 |
| 5,161,915 A | 11/1992 | Hansen | ....................... | 405/129 |
| 5,181,800 A | 1/1993 | Stankus et al. | ........... | 405/259.6 |
| 5,244,314 A | 9/1993 | Calandra, Jr. et al. | .... | 405/259.4 |
| 5,249,898 A | 10/1993 | Stepanski et al. | ............. | 411/82 |
| 5,314,268 A | 5/1994 | Calandra, Jr. et al. | .... | 405/259.5 |
| 5,375,946 A | 12/1994 | Locotos | .................... | 405/259.4 |
| 5,378,087 A | 1/1995 | Locotos | .................... | 405/259.5 |
| 5,387,060 A | 2/1995 | Locotos | .................... | 405/259.6 |
| 5,437,830 A | 8/1995 | Calandra, Jr. et al. | ....... | 264/296 |
| 5,452,977 A | 9/1995 | Terrizzi | ....................... | 411/82 |

(Continued)

FOREIGN PATENT DOCUMENTS

CH 564 654 7/1975

(Continued)

OTHER PUBLICATIONS

U.S. Appl. No. 60/613,150 entitled "Point Anchor Resin Bolt".

(Continued)

*Primary Examiner*—David R Sample
*Assistant Examiner*—Lawrence D Ferguson
(74) *Attorney, Agent, or Firm*—Steptoe & Johnson LLP

(57) ABSTRACT

A mine support includes an elongate metal member and a coating comprising post-consumer recycled thermoplastic disposed on the member. The thermoplastic may include post-consumer recycled poly(ethylene terephthalate), and the coating may be an injection molded coating. A first layer of the coating may be provided with a thickness at least about 0.1 mm and a crystallinity between about 16% and about 30%, and a second layer of the coating may be provided with a thickness at least about 0.1 mm and a crystallinity between about 6% and about 14%. Either the first layer or second layer may contact the elongate metal member.

98 Claims, 20 Drawing Sheets

U.S. PATENT DOCUMENTS

| | | | | |
|---|---|---|---|---|
| 5,472,296 | A | 12/1995 | von Allmen et al. | 405/233 |
| 5,526,720 | A | 6/1996 | Locotos | 81/121.1 |
| 5,584,608 | A | 12/1996 | Gillespie | 405/259.6 |
| 5,624,212 | A | 4/1997 | Gillespie | 405/302.2 |
| 5,647,694 | A | 7/1997 | Locotos | 405/259.4 |
| 5,703,134 | A * | 12/1997 | Asrar et al. | 521/48 |
| 5,707,181 | A | 1/1998 | von Allmen et al. | 405/262 |
| 5,738,466 | A | 4/1998 | Ashmore et al. | 405/302.2 |
| 5,806,275 | A | 9/1998 | Giannuzzi et al. | 52/704 |
| 5,852,115 | A * | 12/1998 | Young et al. | 525/64 |
| 5,853,841 | A | 12/1998 | Castor et al. | 428/99 |
| 5,882,148 | A | 3/1999 | Mraz | 405/259.1 |
| 5,890,843 | A | 4/1999 | Bastick et al. | 405/259.1 |
| 6,033,153 | A | 3/2000 | Fergusson | 405/259.6 |
| 6,079,907 | A | 6/2000 | Valero Ruiz et al. | 405/259.1 |
| 6,402,433 | B1 | 6/2002 | Gillespie | 405/259.1 |
| 6,413,075 | B1 | 7/2002 | Koch et al. | 425/526 |
| 6,451,874 | B1 | 9/2002 | Purgett et al. | 523/172 |
| 6,494,643 | B1 | 12/2002 | Thurner | 405/244 |
| 6,527,482 | B1 | 3/2003 | Stankus | 405/259.5 |
| 6,545,068 | B1 | 4/2003 | Simmons et al. | 524/56 |
| 6,565,288 | B1 | 5/2003 | McCallion | 405/259.5 |
| 6,583,217 | B1 | 6/2003 | Li et al. | 524/650 |
| 7,073,982 | B2 | 7/2006 | Stankus et al. | 405/259.6 |
| 7,296,950 | B1 | 11/2007 | Stankus et al. | 405/259.6 |
| 2002/0064430 | A1 | 5/2002 | Li et al. | 405/259.5 |
| 2002/0108348 | A1 | 8/2002 | Yukimoto et al. | 52/747.12 |
| 2002/0159843 | A1 | 10/2002 | Hubbell et al. | 405/231 |
| 2002/0174816 | A1 | 11/2002 | Barmakian et al. | 114/219 |
| 2003/0099518 | A1 | 5/2003 | Barley | 405/259.1 |
| 2003/0143038 | A1 | 7/2003 | Babcock | 405/259.1 |
| 2003/0185634 | A1 | 10/2003 | Babcock | 405/284 |
| 2003/0219316 | A1 | 11/2003 | Rataj | 405/259.1 |
| 2006/0078391 | A1 | 4/2006 | Stankus et al. | 405/259.4 |
| 2008/0260471 | A1 | 10/2008 | Simmons et al. | 405/259.1 |

FOREIGN PATENT DOCUMENTS

| | | |
|---|---|---|
| CN | 2238911 Y | 10/1996 |
| DE | 101 00 715 A1 | 7/2002 |
| EP | 0 196 451 A1 | 10/1986 |
| EP | 0 255 392 A1 | 2/1988 |
| FR | 2 643 096 | 8/1990 |
| GB | 1 255 413 | 12/1971 |
| GB | 1 382 054 | 1/1975 |
| GB | 1 437 339 | 5/1976 |
| GB | 1 524 524 | 9/1978 |
| GB | 2 004 967 A | 4/1979 |
| GB | 2 023 021 A | 12/1979 |
| GB | 2 138 732 A | 10/1984 |
| GB | 2 241 759 A | 9/1991 |
| GB | 2 241 998 A | 9/1991 |
| JP | 2-279818 | 11/1990 |
| WO | WO 00/00718 | 1/2000 |
| WO | WO 01/77493 A1 | 10/2001 |
| WO | WO 2008/130415 A1 | 10/2008 |

OTHER PUBLICATIONS

Prosecution history for U.S. Appl. No. 11/232,163 entitled "Point Anchor Coated Mine Roof Bolt".

Prosecution history for U.S. Appl. No. 11/474,006 entitled "Point Anchor Coated Mine Roof Bolt".

Prosecution history for U.S. Appl. No. 11/788,386 entitled "Mine Roof Bolt with Resin Control Surface".

International Search Report and Written Opinion for PCT International Application No. PCT/US2004/642, Dec. 16, 2004.

International Preliminary Report on Patentability for PCT International Application No. PCT/US2004/642118, Dec. 16, 2004.

Additional prosecution history for U.S. Appl. No. 11/788,386 entitled "Mine Roof Bolt with Resin Control Surface" beginning Feb. 4, 2009.

Daw-Ming Fann et al., "Kinetics and Thermal Crystallinity of Recycled PET. II. Topographic Study on Thermal Crystallinity of the Injection-Molded Recycled PET," *Journfal of Applied Polymer Sience* 61 (1996), p. 261-271.

C. Mark, C. Compton, D. Oyler and D. Dolinar, "Anchorage Pull Testing for Fully Grouted Roof Bolts," Paper #13 in *Proceedings 21st International Conference on Ground Control in Mining*, p. 105-113, Aug. 6-8, 2002, ISBN 0-939084-56-9.

Mancini, Sandro Donnini and Zanin, Maria, "Recyclability of Pet from Virgin Resin;" *Materials Research*, vol. 2, No. 1 (1999), pp. 33-38.

ASTM D 3417—83, "Standard Test Method for Heats of Fusion and Crystallization of Polymers by Thermal Analysis.", Mar. 1988.

ASTM D 3418—82, "Standard Test Method for Transition Temperatures of Polymers by Thermal Analysis.", 1988.

ASTM D 4603—96, "Standard Test Method for Determining Inherent Viscosity of Poly(Ethylene Terephthalate) (PET) by Glass Capillary Viscometer.", May 1997.

ASTM D 2857—95, "Standard Practice for Dilute Solution Viscosity of Polymers.", Apr. 1995.

ASTM D 1238—95, "Standard Test Method for Flow Rates of Thermoplastics by Extrusion Plastometer.", 1996.

ASTM E 1356—91, "Standard Test Method for Glass Transition Temperatures by Differential Scanning Calorimetry or Differential Thermal Analysis.", Apr. 1991.

Brandt, A.M., *Cement-based Composites: Materials, Mechanical Properties and Performance*. E & FN Spon, U.K., 1995, p. 47-55.

David J. White, "Microstructure of Composite Material From High-Lime Fly Ash and RPET," *Journal of Materials in Civil Engineering* (Feb. 2000), p. 60-65.

Table of Properties of 200 Linear Macromolecules and Small Molecules, "Poly(ethylene terephthalate) (PET)," Advanced Thermal Analysis Laboratory, ATHAS Data Bank, http:web.utk.edu/~athas/databank/, 4 pages, 2000.

David Bigby, Coal mine roadway support system handbook. Research Report 229a. HSE Books, Crown, United Kingdom, 2004.

* cited by examiner

COATED MINING BOLT

CROSS-REFERENCE TO RELATED APPLICATIONS

The benefits of Provisional Application No. 60/529,736 filed Dec. 17, 2003, Provisional Application No. 60/529,750 filed Dec. 17, 2003, and Provisional Application No. 60/548,183 filed Mar. 1, 2004 are claimed under 35 U.S.C. §119(e), and the entire contents of these applications are expressly incorporated herein by reference thereto.

FIELD OF THE INVENTION

The invention is related to a mining bolt and methods of use thereof. In particular, the invention is related to a grouted system for mine roof reinforcement including a mining bolt with a central portion formed of a first material and a perimetral portion formed of a second material.

BACKGROUND OF THE INVENTION

The primary roof support systems used in coal mines include headed rebar bolts typically 4 feet to 6 feet in length, ¾ inch and ⅝ inch in diameter, and used in conjunction with resin grouting in 1 inch diameter holes.

Typically, grouting is accomplished using multi-compartment resin cartridges. For example, as disclosed in U.S. Pat. No. 3,861,522 to Llewellyn, a compartmented package may be used in which a longitudinal diaphragm, made of film, is sealed to the inner wall of a circular tubular member, also made of film, to form at least two continuous longitudinal linear junctures therebetween in a manner such that the volumes of the resulting compartments are variable. A two-compartment package having infinite relative volume variability in both compartments is preferred.

Another resin capsule for mining roof bolting systems is disclosed in U.S. Pat. No. 4,239,105 to Gilbert. A multi-compartment capsule has a longitudinally extending tubular inner compartment for containing a catalyst and a longitudinally extending tubular outer compartment around the inner compartment for containing a resin composition. The longitudinally extending tubular inner and outer compartments are formed by a single-ply film strip of polyester material to which are welded along opposite longitudinal edges two-ply strips having a first ply of polyester material welded to the polyester film strip of the single-ply strip and a second ply of polyethylene material. The composite sheet made up of the single-ply strip and two-ply strips is folded upon itself along one two-ply marginal edge to form the tubular inner compartment so that the polyethylene ply material at the composite strip edge contacts such ply material when folded and is welded thereto. The opposite two-ply marginal edge of the composite strip is then folded over the formed inner compartment so as to bring the polyethylene ply material at the edge into contact with the polyethylene ply material of the other edge and is welded thereto to form the tubular outer compartment.

Resin cartridges can suffer from a substantial stiffness problem. In particular, as disclosed in U.S. Pat. No. 6,545,068 B1 to Simmons et al., within about two months, the cartridges become limp or lacking in stiffness or firmness such that a cartridge containing a grouting composition is not as rigid as the cartridge originally packaged. Limp cartridges are a problem for the customer because limp cartridges are difficult to insert into overhead boreholes. A process is disclosed for substantially improving the firmness of a grouting composition, with a compressible substance introduced into the grouting composition. The compressible substance is selected from the group consisting of nitrogen, oxygen, air, carbon dioxide, foam rubber, carbon dioxide, argon, and combinations of two or more thereof.

Turning to the mine bolts used in combination with the resin cartridges, ¾ inch bolts offer significant performance advantages over ⅝ inch bolts. First, as compared to the use of ⅝ inch bolts, when ¾ inch bolts are installed in 1 inch diameter holes, a smaller annulus is provided between the bolt and the borehole wall thereby allowing improved mixing of resin and catalyst in the annulus. The improved mixing especially is important with resin cartridges that have a high ratio of resin to catalyst. Such resin cartridges typically have resin/catalyst ratios of between about 60/40 and about 90/10. Second, the resin cartridges typically employed when grouting bolts in holes must be "shredded" in situ to release the resin and catalyst in the cartridge and then permit mixing thereof. Generally, it is known that when there is an annulus larger than ⅛ inch, large pieces of the shredded cartridge can significantly interfere with resin/catalyst mixing and concomitantly result in poor strength between the bolt and borehole wall. This phenomenon of "glove fingering" is known to occur when the plastic film that forms the cartridge lodges in the borehole proximate the surrounding rock, thereby interrupting the mechanical interlock desirably formed by the resin and rock. Third, the smaller annulus provided by a ¾ inch bolt in a 1 inch hole (e.g., an annulus of ⅛ inch) provides a much stiffer support system, with less movement per unit of load and less creep. Such strength advantages have been demonstrated in extensive studies conducted in Australia and the United States, and in fact show that a 1/16 inch annulus is even better. See, e.g., C. Mark, C. Compton, D. Oyler and D. Dolinar, "Anchorage pull testing for fully grouted bolts," Paper # 13 in 21*st International Conference on Ground Control in Mining*, Aug. 6-8, 2002, ISBN 0-939084-56-9.

Despite its disadvantages, the ⅝ inch bolt is used in approximately 50% of coal mines because it is lighter, easier to use, and lower in cost than the ¾ inch bolt. Lower weight bolts are advantageous in the mine setting. When a bolt is inserted for example in a 1 inch diameter hole that is 4 feet to 6 feet in length, the gap between the bolt and hole must completely be filled with resin to ensure sufficient strength in grouting. By using a smaller diameter bolt and more resin, the overall weight of the grouting system is lowered because the specific gravity of the bolt is about 8.6 as compared to about 2.0 for the resin. The difference in weight between a ⅝ inch bolt and a ¾ inch bolt fully grouted with resin in a 4 foot long hole is about 1 pound per bolt. Although this weight disparity may be accommodated by drilling a smaller diameter hole thus requiring less resin, a hole with a diameter smaller than 1 inch is more difficult and expensive in mining operations because of limitations associated with removal of the drill cuttings and the stiffness of typical drill bits.

Waste polyethylene terephthalate (PET) polymer is neither environmentally biodegradable nor compostable, and thus suffers from disposal problems. Recycling has become a viable alternative to the long-term accumulation of garbage, and there is substantial availability of recyclable PET waste. For example, post-consumer PET derived from soft drink bottles is available in bulk for relatively low cost. Bottle-grade PET is known to be of high quality among the various PET grades, and is available particularly as washed flakes. There are major incentives from environmental perspectives and governmental regulatory directives to find new and improved uses for PET waste.

British Published Patent Application GB 2 138 732 A relates to an anchor useful in mining, construction and civil engineering. The published patent application discloses a sleeve formed on the end of an anchor element, e.g., rebar, by placing an end of the element in a reusable plastics mould, having a former for at least one thread, and containing a self setting shrinking composition. According to the patent application, the composition may be cementitious or resinous: polyester or epoxy resin compositions. As described, a quantity of polyester grout Lokset is supplied into the mould to cast a sleeve on a threaded bar. The published patent application, however, does not discuss the use of PET, the desirability of using post-consumer recycled PET, or the use of injection molded polymer coatings on mine supports.

British Patent Specification 1,382,054 is directed to fixing bolts in blind holes and discloses a method of securing a bolt in a hole comprising applying a sleeve to an end portion of the bolt. According to the specification, the sleeve may be formed of wood or a hardenable composition, e.g., a filled resin or a cementitious mortar. Also, the sleeve may be preformed of a plastics material, and the specification states that suitable plastics materials for such sleeves are: polyacetal or polyformaldehyde resin, polyamides e.g. nylon acrylonitrile/butadiene/styrene copolymers, polyolefins or any other polymer having the requisite or desired properties. The specification further discloses that one end of a bolt may be inserted in a mold and a castable composition poured in to form the sleeve; the composition sets and any shrinkage takes place in making the sleeve. The published patent specification, however, does not discuss the use of PET, the desirability of using post-consumer recycled PET, or the use of injection molded polymer coatings on mine supports.

Despite these developments, there remains a need for a mine support that is formed in part of post-consumer recycled polymers such as PET. There further remains a need for mine supports with polymer coatings formed of materials by methods other than casting, such as injection molding. Also, there remains a need for mine supports that are formed in part of thermoplastic polymer coatings that are molded onto the supports.

As an unreinforced, semi-crystalline thermo-plastic polyester, PET has excellent wear resistance, excellent hardness and stiffness, very good creep resistance, low coefficient of friction, high flexural modulus, and superior dimensional stability. Nevertheless, PET—particularly following melting and resolidifying of post-consumer recyclable waste—can be quite brittle and as such can be inappropriate in some applications.

U.S. Pat. No. 6,583,217 B1 to Li et al. is directed to a composite material composed of fly ash and waste PET. Melted waste, chemically unmodified PET material and fly ash particles are mixed in a vessel to disperse fly ash particles in the melted PET material. The resulting mixture then is cooled to solidify the melted PET material to form a composite material having a matrix comprising PET and dispersoids distributed in the matrix and comprising fly ash particles.

There exists a need for a mining bolt system that overcomes the disadvantages of poor mixing and poor shredding of the resin capsule package. In particular, there exists a need for a composite mining bolt system that will support a load of ten tons with less than ½ inch deflection in a 12 inch anchored length.

In addition, despite known composite materials, there exists a need for alternative PET materials with less susceptibility to brittle behavior. More particularly, there exists a need for a PET material appropriate for use in coating metals used in mechanically rigorous applications. Also, there exists a need for a composite material formed of cement and recycled PET, along with a method of making same.

SUMMARY OF THE INVENTION

The invention relates to a composite grouted mining bolt system including a first central portion with a first specific gravity, a second perimetral portion with a second specific gravity and disposed on the first central portion, and grout abutting the second perimetral portion. The second specific gravity is substantially lower than the first specific gravity, the second perimetral portion has a maximum thickness of at least 1 mm, and the grout has a maximum thickness between about 0.5 mm and about 6 mm. In some embodiments, the grout has a maximum thickness no greater than about 3 mm. The second specific gravity may be less than about 3.0 and the first specific gravity may be greater than about 6.0. Also, the second specific gravity may be less than about 3.0 and the first specific gravity may be greater than about 7.0. The second perimetral portion may have a maximum thickness at least 2 mm, a maximum thickness at least 3 mm or a maximum thickness at least 4 mm. In some embodiments, the second perimetral portion may have a maximum thickness at least 2 mm and no more than 6 mm, or instead the second perimetral portion may have a maximum thickness at least 3 mm and no more than 6 mm, or instead the second perimetral portion may have a maximum thickness at least 3 mm and no more than 5 mm.

The first central portion of the composite mining bolt may be formed of metal and the second perimetral portion may be formed of polymer. The metal may be steel, and the polymer may be poly(ethylene terephthalate). The polymer also may further include polyethylene and/or a mineral filler. Alternatively, the polymer may be polymethylmethacrylate and/or polycarbonate. The second perimetral portion also may be formed of other polymers such as polyethylene, polypropylene, acrylonitrile butadiene styrene, and nylon.

In one embodiment, the second perimetral portion may be formed of polymer that optionally includes mineral filler, with the polymer being selected from the group consisting of poly(ethylene terephthalate), polyethylene, polymethylmethacrylate, polycarbonate, polypropylene, acrylonitrile butadiene styrene, nylon, poly(vinyl chloride), aramid, and mixtures thereof.

In another embodiment, the first central portion is formed of fiberglass.

The second perimetral portion may include polymer and a filler. For example, the second perimetral portion may include cement. Fillers that may be used include silicon dioxide, limestone, cement, and fly ash.

The first central portion may be disposed about a longitudinal axis, and the second perimetral portion may have a non-uniform thickness along the longitudinal axis. For example, the first central portion may include a first end with a head disposed thereon and a second free end, wherein the thickness of the second perimetral portion is tapered from the first end to the second end. Also, the thickness of the second perimetral portion may be greater proximate the free end than proximate the head.

In some embodiments, the second perimetral portion may include threads and the thickness of the second perimetral portion may be greatest at the threads.

The second perimetral portion may have a lower thermal conductivity than the first central portion. Additionally, the second perimetral portion may have a shear strength of at least 4000 psi, a shear strength of at least 5000 psi, or a shear strength of at least 6000 psi.

A maximum radial thickness of the first central portion may be at least a factor of two greater than a maximum thickness of the second perimetral portion, or alternatively a maximum radial thickness of the first central portion may be at least a factor of 1.5 greater than a maximum thickness of the second perimetral portion.

The second perimetral portion may have a maximum thickness at least one-tenth of the maximum thickness of the first central portion, or alternatively the second perimetral portion may have a maximum thickness at least one-fifth of the maximum thickness of the first central portion.

The second perimetral portion may have texturing. The first central portion may have outer texturing and the second perimetral portion may at least partially follow the texturing.

The first central portion and second perimetral portion of the composite mining bolt may be configured and dimensioned such that the composite mining bolt will support a load of ten tons with less than ½ inch deflection in a 12 inch anchored length.

The invention also relates to a composite mining bolt including: an elongate metal member; and an outer polymer layer disposed on the member and having a maximum thickness of at least 1 mm; wherein the member and layer are configured and dimensioned such that the composite mining bolt will support a load of ten tons with less than ½ inch deflection in a 12 inch anchored length.

In addition, the invention relates to a composite mining bolt comprising: an elongate metal member; and an outer polymer layer disposed on the member and having a maximum thickness of at least 1 mm; wherein the outer polymer layer is formed of a mixture including poly(ethylene terephthalate) and polyethylene; and wherein the member and layer are configured and dimensioned such that the composite mining bolt will support a load of ten tons with less than ½ inch deflection in a 12 inch anchored length. In some embodiments, the mixture may include no more than 5% of polyethylene. In other embodiments, the mixture may include no more than 15% of polyethylene. In yet other embodiments, the mixture may include no more than 25% of polyethylene.

Furthermore, the invention relates to a mine roof support system including: an elongate metal member; a first layer of a first polymer; and a second layer of a second polymer disposed between the member and the first layer. The second polymer may be poly(ethylene terephthalate), and the first polymer may be a polyester resin.

Moreover, the invention relates to a method of supporting a mine roof including: providing a bolt comprising a first central portion with a first specific gravity and a second perimetral portion with a second specific gravity and disposed on the first portion and having protruding inclined surfaces thereon, with the second specific gravity being substantially lower than the first specific gravity, and wherein the second perimetral portion has a maximum thickness at least 1 mm; forming a borehole in the mine roof; disposing the bolt in the borehole; grouting the bolt in the borehole such that the bolt supports a load of ten tons with less than ±2 inch deflection in a 12 inch anchored length.

In addition, the invention relates to a method of supporting a mine roof, the method comprising: providing a bolt comprising a first central portion with a first specific gravity and a second perimetral portion with a second specific gravity and disposed on the first portion and having protruding inclined surfaces thereon, with the second specific gravity being substantially lower than the first specific gravity, and wherein the second perimetral portion has a maximum thickness at least 1 mm; forming a borehole in the mine roof with one closed end; inserting a vessel containing grout into the borehole; inserting the bolt into the borehole; puncturing the vessel with the bolt so that grout is released from the vessel; rotating the bolt in the borehole so that the released grout is distributed toward the closed end of the borehole by the protruding inclined surfaces.

Rotation of the bolt may cause frictional heating of the grout, and the frictional heating may be sufficient to substantially accelerate curing thereof. Also, when the bolt is rotated, the grout is simultaneously mixed and distributed toward the closed end of the borehole.

The protruding inclined surfaces may form threading, and the threading may be discontinuous. Also, the threading may be discontinuous about a longitudinal axis of the bolt such that at least one thread only extends through 180 degrees. Further, the threading may be discontinuous about a longitudinal axis of the bolt and at least two threads each have two ends.

The maximum width of the bolt may be at least the maximum width of the vessel. The vessel may have at least two compartments and the maximum width of the bolt may be at least the width of two of the compartments. The grout may contact a substantial portion of the inner wall of the borehole.

The vessel may be shredded. In one embodiment of the method, the vessel is shredded so that the shredded portions of the vessel are disposed remote from the inner wall of the borehole. In another embodiment of the method, the vessel is substantially shredded so that the shredded portions of the vessel are distributed throughout the resin. Additionally, the vessel may be substantially shredded so that the shredded portions of the vessel are substantially uniformly distributed throughout the resin. And, the vessel may be substantially shredded so that the shredded vessel does not substantially interfere with the anchorage strength of the bolt in the borehole.

The vessel may have two compartments, with a first of the compartments containing unsaturated polyester resin and cross-linking agent and with a second of the compartments contains benzoyl peroxide catalyst. At least one of the two compartments may further contain limestone.

In one embodiment, the grout cures in between 10 seconds and 30 seconds. In another embodiment, the grout cures in between 15 seconds and 1 minute. In yet another embodiment, the grout cures in no more than 10 minutes.

The invention additionally relates to a method of supporting a mine roof, the method including: forming a borehole in the mine roof with one closed end, the borehole having a borehole maximum width; providing a bolt comprising a first material with a first specific gravity; coating the bolt with a second material with a second specific gravity so that the bolt has a bolt maximum shaft width no more than 6 mm smaller than the borehole maximum width; forming protruding inclined surfaces with the second material; inserting a vessel containing grout into the borehole; inserting the bolt into the borehole; puncturing the vessel with the bolt so that grout is released from the vessel; rotating the bolt in the borehole so that the released grout is distributed toward the closed end of the borehole by the protruding inclined surfaces. The bolt maximum shaft width may be more than the borehole maximum width.

Also, the invention relates to a method of forming a mining bolt including: coating a central metal member with a flowable polymer so that the coating has a maximum thickness of at least 1 mm; allowing the polymer to solidify on the central metal member; texturing the polymer. The coating step may include dip coating, injection molding and/or hot forging.

The invention further relates to a composite mining bolt system including: a member comprising (1) a first central portion with a first specific gravity and (2) a second perimetral portion with a second specific gravity, the second perimetral portion being disposed on the first portion; a receptacle for holding a volume of resin therein; wherein the second specific gravity is substantially lower than the first specific gravity; and wherein the second perimetral portion is sized to displace at least about 30% of the resin volume when the member is inserted into the receptacle.

The second perimetral portion may be sized to displace at least about 50% of the resin volume when the member is inserted into the receptacle, or alternatively may be sized to displace at least about 75% of the resin volume when the member is inserted into the receptacle.

The receptacle may have a third specific gravity, and the second specific gravity may be at least 20% less than the third specific gravity. The receptacle may have a third specific gravity, and the second specific gravity may be between about 40% and about 70% less than the third specific gravity.

In addition, the invention relates to a method of supporting a mine roof including: creating a hole between 0.75 inch and 1.25 inches in diameter in a mine roof; inserting a receptacle holding a volume of resin into the hole; inserting a textured member into the hole, the textured member having a first central portion with a first specific gravity and a second perimetral portion with a second specific gravity lower than the first specific gravity and disposed on the first portion; penetrating the receptacle with the textured member to release resin from therein, with the second perimetral portion displacing at least about 30% of the resin volume.

The hole may have a diameter between about 0.9 inch and about 1.1 inch, and the textured member may have a diameter between about 0.6 inch and about 0.7 inch. The hole and the textured member may be sized to have a maximum gap of no greater than 0.125 inch therebetween when the textured member is inserted in the hole.

The method may further include: articulating the textured member in the receptacle to shred the receptacle. Also, the method may further include articulating the textured member in the receptacle to mix the resin. And, the method may further include: allowing the resin to cure to secure the textured member in the hole.

The invention relates to a mine support including an elongate metal member and a coating comprising post-consumer recycled poly(ethylene terephthalate) disposed on the member. The coating may be an injection molded coating. In some embodiments, the coating may include a first layer with a thickness at least about 0.1 mm and a crystallinity between about 16% and about 30%, and optionally may include a second layer with a thickness at least about 0.1 mm and a crystallinity between about 6% and about 14%. The first layer or the second layer may contact the elongate metal member. Also, the thickness of the first layer may be at least about 1.0 mm and the thickness of the second layer may be at least about 0.2 mm. The coating may further include a third layer with a thickness at least about 0.1 mm and a crystallinity between about 6% and about 14%, and wherein the first layer is disposed between the second and third layers. In other embodiments, the first layer may have a thickness at least about 0.1 mm and a crystallinity between about 16% and about 28%, the second layer may have a thickness at least about 0.1 mm and a crystallinity between about 8% and about 12%, and the third layer may have a thickness at least about 0.1 mm and a crystallinity between about 8% and about 12%. In yet other embodiments, the first layer may have a thickness at least about 0.1 mm and a crystallinity between about 16% and about 26%, the second layer may have a thickness at least about 0.1 mm and a crystallinity between about 8% and about 12%, and the third layer may have a thickness at least about 0.1 mm and a crystallinity between about 8% and about 12%.

The coating further may include a second polymer that is substantially insoluble with respect to the post-consumer recycled poly(ethylene terephthalate). The second polymer may be a polymer with a glass transition temperature less than about 20° C. or less than about 0° C. In addition, the second polymer may be a polyolefin such as polyethylene or polypropylene, and the coating may be at least 80% poly(ethylene terephthalate) by weight of polymer therein.

The invention additionally relates to a mine support including an elongate metal member and a coating comprising post-consumer recycled thermoplastic disposed on the member. The thermoplastic may be post-consumer recycled poly(ethylene terephthalate) or post-consumer recycled polycarbonate, and the coating may be an injection molded coating. The coating may further include about 1% or less of metal by weight of polymer therein, and the metal may be aluminum. The thermoplastic may further include a second polymer with a glass transition temperature less than about 20° C. or less than about 0° C. In some embodiments, the thermoplastic may further include a second polymer that may be a polyolefin such as polyethylene or polypropylene, and the coating may be at least 80% polycarbonate by weight of polymer therein. Also, the first polymer may have an intrinsic viscosity at least about 0.35 dL/g and no greater than about 0.75 dL/g.

Moreover, the invention relates to a mine roof support including an elongate metal member and a coating disposed on the member, the coating including an inhomogeneous mixture of post-consumer recycled first and second polymer phases. The first polymer phase may be poly(ethylene terephthalate), and the second polymer phase may be a polymer with a glass transition temperature less than about 20° C. or less than about 0° C. The second polymer phase may be a polyolefin such as polyethylene or polypropylene, and the coating may be at least 80% poly(ethylene terephthalate) by weight of polymer therein. In other embodiments, the first polymer phase may be polycarbonate and the second polymer phase may be polymethylmethacrylate. The coating may further include about 1% or less of metal by weight of polymer therein, and the metal may be aluminum. In certain embodiments, the first polymer phase may be polycarbonate and the second polymer phase may be a polymer with a glass transition temperature less than about 20° C. or less than about 0° C. In yet other embodiments, the first polymer phase may include polyethylene naphthalate.

In some embodiments, the invention further relates to a mine roof support including an elongate metal member and a coating formed at least in part from poly(ethylene terephthalate). The coating is disposed on the member and includes a first layer with a thickness at least about 0.1 mm and a crystallinity at least about 30%. The coating also may include a second layer with a thickness at least about 0.1 mm and a crystallinity about 28% or lower. In one exemplary embodiment, the second layer contacts the elongate metal member. In another exemplary embodiment, the first layer contacts the elongate metal member. The thickness of the first layer may be at least about 1.0 mm, and the thickness of the second layer may be at least about 0.2 mm. The coating may further include a third layer with a thickness at least about 0.1 mm and a crystallinity about 28% or lower, with the first layer being disposed between the second and third layers. The coating may be substantially formed of virgin poly(ethylene terephthalate), or the coating may be substantially formed of post-consumer poly(ethylene terephthalate).

Also, the invention relates to a mine roof support including an elongate metal member and a coating disposed on the member. The coating is formed at least in part from first and second polymers that are substantially insoluble with respect to each other. In one embodiment, the first polymer may be poly(ethylene terephthalate), while in another embodiment the first polymer may be polycarbonate and optionally may be post-consumer polycarbonate. The second polymer may be a polymer with a glass transition temperature less than about 20° C., or with a glass transition temperature less than about 0° C. The second polymer may be a polyolefin such as polyethylene or polypropylene, and the coating may have at least 80% poly(ethylene terephthalate) by weight of polymer therein or at least 80% polycarbonate by weight of polymer therein. The coating optionally further may include about 1% or less of metal by weight of polymer therein, and the metal may be aluminum.

In addition, the invention relates to a mine roof support including an elongate metal member and a coating disposed on the member. The coating is formed of an inhomogeneous mixture of first and second polymer phases. In one embodiment, the first polymer phase may be poly(ethylene terephthalate), while in another embodiment the first polymer phase may be polycarbonate and optionally may be post-consumer polycarbonate. The second polymer phase may be a polymer with a glass transition temperature less than about 20° C., or with a glass transition temperature less than about 0° C. The second polymer phase may be a polyolefin such as polyethylene or polypropylene, and the coating may have at least 80% poly(ethylene terephthalate) by weight of polymer therein or at least 80% polycarbonate by weight of polymer therein. The coating optionally further may include about 1% or less of metal by weight of polymer therein, and the metal may be aluminum.

In yet another embodiment, the invention relates to an elongate metal member and a coating disposed on the member. The coating may be formed of a first polymer, with the first polymer having an intrinsic viscosity at least about 0.35 dL/g and no greater than about 0.75 dL/g, and the first polymer comprising poly(ethylene terephthalate). The coating may further include a second polymer, with the coating comprising at least 80% poly(ethylene terephthalate) by weight of polymer therein. The coating further may be formed of a second polymer, with the first and second polymers being insoluble with respect to each other. The first and second polymers may form a fibrous structure, a ribbon structure, and/or an interwoven structure on the member.

The invention also relates to a method of forming a mine roof support including: placing an elongate metal member in a mold, the member having a first temperature at an outer surface thereof; injecting polymer into the mold, an inner surface of the mold having a second temperature different from the first temperature; forming a first semi-crystalline layer of the polymer proximate the outer surface of the member; forming a first substantially amorphous layer of the polymer proximate the inner surface of the mold. In some preferred embodiments, the first semi-crystalline layer may have a crystallinity of between about 16% and about 30% and the first substantially amorphous layer may have a crystallinity of between about 6% and about 14%. In other embodiments, the first semi-crystalline layer may have a crystallinity of greater than about 30%, while the first substantially amorphous layer may have a crystallinity of less than about 28%. Also, the first semi-crystalline layer may have a thickness of at least about 0.1 mm, and the first substantially amorphous layer may have a thickness of at least about 0.1 mm. The polymer at least in part may include: (1) an inhomogeneous mixture of poly(ethylene terephthalate) and polyethylene, (2) an inhomogeneous mixture of poly(ethylene terephthalate) and polypropylene, (3) an inhomogeneous mixture of polycarbonate and polyethylene, or (4) an inhomogeneous mixture of polycarbonate and polypropylene. The polymer may include first and second polymer phases that are substantially insoluble with respect to each other. In certain embodiments, the polymer may include polyethylene naphthalate.

The method further may include forming a fibrous structure on the member, forming a ribbon structure on the member, and/or forming an interwoven structure on the member. The first temperature may be less than the second temperature. The first temperature may be at least 50° C., at least 100° C., or at least 200° C. greater than the second temperature. The polymer may include (1) a first polymer having a first melt flow rate and (2) a second polymer having a second melt flow rate at least about 10% less than the first melt flow rate at about 270° C. Also, the polymer may include first and second polymer phases, with at least one of the phases having a glass transition temperature less than about 20° C., or at least one of the phases having a glass transition temperature less than about 0° C. The first and second polymer phases may be substantially insoluble with respect to each other.

The elongate metal member may be heated before placing the elongate metal member in the mold. Also, the first temperature may be at least about 50° C., and the second temperature may be at least about 50° C. less than the first temperature.

The invention additionally relates to a mine bolt comprising a metal member and a coating on said member, the coating being formed from ethylene glycol and two diabasic acids. The diabasic acids may be terephthalic acid and isophthalic acid.

Moreover, the invention relates to toughened polyethylene terephthalate. More particularly, the invention relates to a composite material formed of cement and recycled PET, along with a method of making same. Thus, the invention relates to a composite material having a matrix comprising polyethylene terephthalate and cement particles distributed in the matrix. In some embodiments, the matrix comprises chemically unmodified polyethylene terephthalate material. The cement particles may comprise, consist of, or consist essentially of Portland cement that optionally may be substantially Portland type I cement or substantially Portland type II cement. About 50 wt % or less of the composite material may be cement particles. Alternatively, about 40 wt % or less of the composite material may be cement particles. In some embodiments, about 30 wt % or less of the composite material may be cement particles, and in other embodiments about 20 wt % or less of the composite material comprises cement particles. Also, in some embodiments, about 15 wt % or less of the composite material may be cement particles.

About 5 wt % to about 15 wt % of the composite material may be cement particles in some embodiments, while in other embodiments about 5 wt % to about 10 wt % of the composite material may be cement particles. The cement particles may have an average particle size of no more than about 100 µm.

BRIEF DESCRIPTION OF THE DRAWINGS

Preferred features of the present invention are disclosed in the accompanying drawings, wherein.

DETAILED DESCRIPTION OF THE PREFERRED EMBODIMENTS

Figure 1:
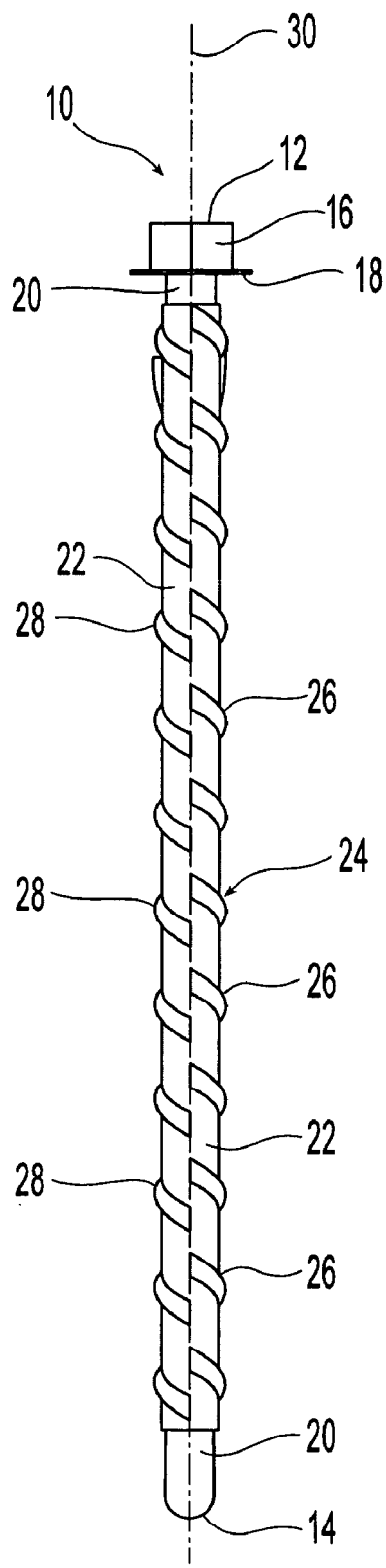
FIG. 1 is a side view of a first embodiment of a coated mine bolt.

Turning to FIG. 1, there is shown an exemplary mine bolt 10 for mine roof reinforcement according to the present invention, particularly for securing in rock. Bolt 10 includes a first end 12 and a second end 14. A head 16 with a shoulder 18 is disposed proximate end 12. A first central portion 20 extends between ends 12, 14 and has a first specific gravity. In a preferred, exemplary embodiment, first central portion 20 is formed of steel. In an alternate embodiment, first central portion 20 is formed of fiberglass. A second perimetral portion 22 with a second specific gravity is disposed on the first central portion between ends 12, 14. Although not specifically shown in FIG. 1, second perimetral portion 22 may extend completely to one or more of flange 18 and ends 12, 14 of mine bolt 10.

In a preferred, exemplary embodiment, second perimetral portion 22 is formed of polymer, and more preferably is formed of poly(ethylene terephthalate) (PET). In alternate embodiments, second perimetral portion 22 is formed of polymer and optionally includes mineral filler, with the polymer being selected from PET, polyethylene, polymethylmethacrylate, polycarbonate, polypropylene, acrylonitrile butadiene styrene, nylon, poly(vinyl chloride), aramid, polybutylene terephthalate (PBT), polyethylene naphthalate (PEN), and mixtures thereof. For example, a blend of PET and PEN may be used. Fillers may be selected, for example, from silicon dioxide, limestone, cement such as Portland cement, and fly ash. In some embodiments, filler materials such as small metallic particles may be used, for example particles of aluminum or steel. Such particles may be sized to have maximum widths of about 1/16 inch. The fillers may be used to add strength and improve the modulus of elasticity of the coating. In yet another alternate embodiment, a material similar to "stucco" used in residential construction or a material such as shotcrete used on mine walls or tunnels instead may serve as second perimetral portion 22. For example, a cementaeous second perimetral portion may be formed from a combination of cement, limestone sand, water and/or fibers.

Second perimetral portion 22 may be formed of polymers characterized as being linear, branched, network, thermosetting, chemical setting, thermoplastic, amorphous, semi-crystalline, copolymers and/or polymer blends. "Thermosetting" polymers are defined as polymers that harden with heating, e.g., undergo further (three-dimensional) polymerization with heating. For example, phenolics are thermosetting materials. Thermosetting polymers typically are insoluble in their cured state. "Chemical setting" polymers are defined as polymers that set through reaction or precipitation, typically between two or more independent materials that are brought together (e.g., a monomer, a cross-linking agent, and an initiator). Epoxy resins are chemical setting polymers that are cured or set into a form that is retained to the polymer's decomposition temperature. Chemical setting polymers often are described as castable and pourable. "Thermoplastic" polymers are defined as polymers that soften with increased temperature, thus becoming moldable, and reharden on cooling. Thermoplastic polymers such as PET have melting or liquefying temperatures and typically have solvents. In a preferred exemplary embodiment of the present invention, second perimetral portion 22 is primarily formed of a thermoplastic polymer. In the context of polymers, "amorphous" as used herein refers to a material have no long range order in its atomic structure which for example is evidenced by a substantial peak proximate the crystallization temperature of the polymer in a differential scanning calorimetry (DSC) thermogram. Also, in the context of polymers, "semi-crystalline" as used herein refers to a material having a semi-patterned atomic structure as evidenced for example by little or no peak proximate the crystallization temperature of the polymer in a DSC thermogram.

In some embodiments of the present invention, reflective elements can be interspersed in or otherwise added to the polymer coating on the central bolt member to enhance visibility of the finished bolt, particularly in the low-light areas within mines. For example, glass beads (also referred to as microspheres or microsphere lenses) that may be light transmissible may be added to the coating. The glass microspheres may be hollow. Also, a portion such as half of each microsphere may be provided with a mirror coating, so that when light hits a microsphere, it is refracted through the surface and transmitted back toward the light source.

The reflective elements may be combined with the solid polymer feed material or may be combined with the polymer melt to be injection-molded onto the bolt. Also, the reflective elements may be bonded to the outermost surface of the coated bolt. Alternatively, the reflective elements even may be spray coated or otherwise dispersed within the mold cavity or cavities so that the surface of the bolt preferentially may be coated with the reflective elements as compared to regions of the coating remote from the surface. The reflective elements may be chemically treated such as with an organochromium compound, silanes, titanates, zirconates, fluorocarbons.

In some embodiments, reflective elements such as glass microspheres may be incorporated in the polymer coating to be at least about 10 volume percent, at least about 20 volume percent, or at least about 30 volume percent of the coating on the central member of the mine bolt.

The reflective elements can also be in the form of ceramic microspheres, e.g., beads. "Ceramic" is used herein to refer to inorganic materials which can be either crystalline (for ceramics, a material having a patterned atomic structure sufficient to produce a characteristic x-ray diffraction pattern) or amorphous (for ceramics, a material having no long range order in its atomic structure evidenced by the lack of a characteristic x-ray diffraction pattern). Amorphous ceramics are more commonly known as glasses.

Reflective elements for use with the present invention include those as described for example in U.S. Pat. No. 6,451,874 B1 to Purgett et al., assigned to 3M Innovative Properties Company (St. Paul, Minn.), which is incorporated herein by reference thereto. Other materials for use with the present invention include prismatic light reflective plastic materials. In some embodiments of the present invention, coated mine bolts may include 3M™ Scotchlite™ retroreflective materials.

Nonlimiting examples of the fillers contemplated for use with the polymer coatings of the present invention are static dissipative fibers, ceramic microspheres, hollow polymeric microspheres (such as those available under the trade designation EXPANCEL 551 DE from Akzo Nobel, Duluth, Ga.), and hollow glass microspheres (such as those available under the trade designation K37 from Minnesota Mining and Manufacturing Co., St Paul, Minn.). Other suitable materials that may provide reflective properties include mica and sand of suitable particulate sizes.

The present invention further contemplates the use of pigments, extenders, diluents, plasticizers, leveling agents, and surfactants with the polymer coatings for the mine bolts of the present invention. Optionally, the polymer coatings for the mine bolts of the present invention may include a luminescent component.

In a preferred, exemplary embodiment, bolt 10 is provided with texturing 24 in the form of threading. Preferably, the first central portion also comprises outer texturing, on which the texturing of the second perimetral portion at least partially coincides. For example, in dip-coating they will coincide, while in injection molding they may partially coincide. As shown in FIG. 1, texturing 24 is formed by a discontinuous thread, represented for example by paired thread portions 26, 28. If a polymer is to be molded onto first central portion 20, for example, using two mold halves, a parting line may exist along central axis 30. Texturing 24 thus is discontinuous about a longitudinal axis of the bolt. In a preferred, exemplary embodiment, at least one of thread portions 26, 28 only extends through 180 degrees. In another preferred, exemplary embodiment, at least two of the thread portions 26, 28 each have two ends.

Figure 2:
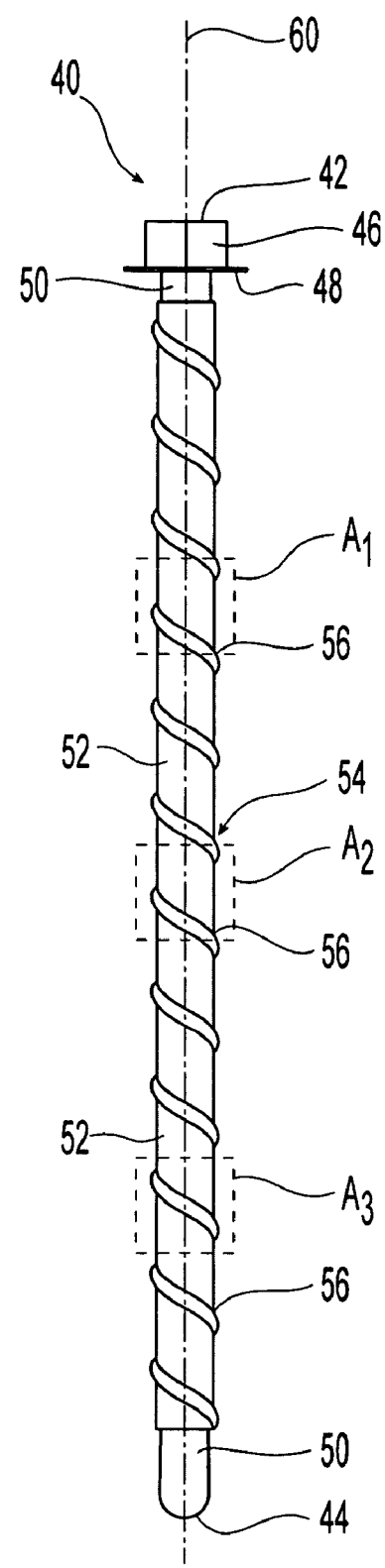
FIG. 2 is a side view of a second embodiment of a coated mine bolt.

With reference to FIG. 2, there is shown another exemplary mine bolt 40 for mine roof reinforcement according to the present invention. Similar to mine bolt 10, the mine bolt 40 includes a first end 42 and a second end 44. A head 46 with a shoulder 48 is disposed proximate end 42. A first central portion 50 extends between ends 42, 44 and has a first specific gravity. In a preferred, exemplary embodiment, first central portion 50 is formed of steel. In an alternate embodiment, first central portion 50 is formed of fiberglass. A second perimetral portion 52 with a second specific gravity is disposed on the first central portion between ends 42, 44. In a preferred, exemplary embodiment, bolt 40 is provided with texturing 54 in the form of threading. Preferably, the first central portion 50 also comprises outer texturing, on which the texturing of the second perimetral portion 52 at least partially coincides. For example, in dip-coating they will coincide, while in injection molding they may partially coincide. As shown in FIG. 2, texturing 54 may be formed by a continuous thread 56. Although not specifically shown in FIG. 2, second perimetral portion 52 may extend completely to one or more of flange 48 and ends 42, 44 of mine bolt 40. The materials described above with respect to second perimetral portion 22 are likewise applicable to second perimetral portion 52.

In each of the exemplary embodiments of FIGS. 1 and 2, the second perimetral portions 22, 52, respectively, optionally may have a non-uniform thickness along axes 30, 60. The thickness of the second perimetral portions 22, 52, respectively, optionally may taper from the first end to the second end of the bolts, and in such case the thickness preferably is greater proximate the free end than proximate the head so as to form a slight taper that will act as a mechanical wedge when load is applied to the bolt head. In some embodiments, the thickness of the second perimetral portion may be greatest proximate the texturing, e.g., the threads.

Figure 2A:
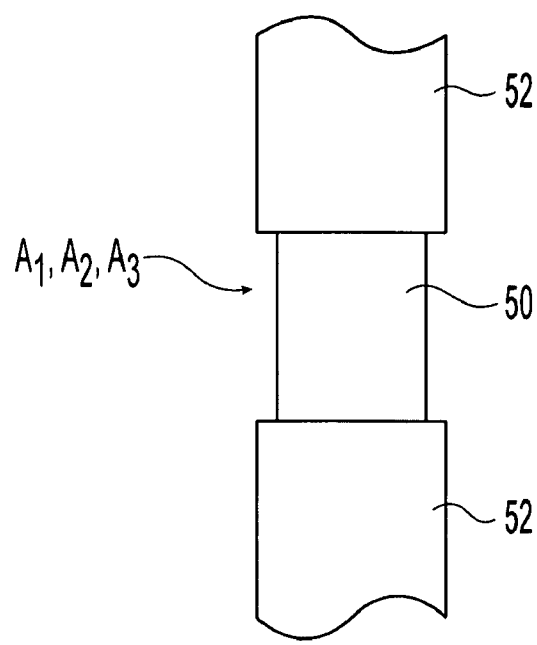
FIG. 2A is a side view of a first exemplary embodiment of a second perimetral portion of the mine bolt of FIG. 2 having a non-uniform thickness.
Figure 2B:
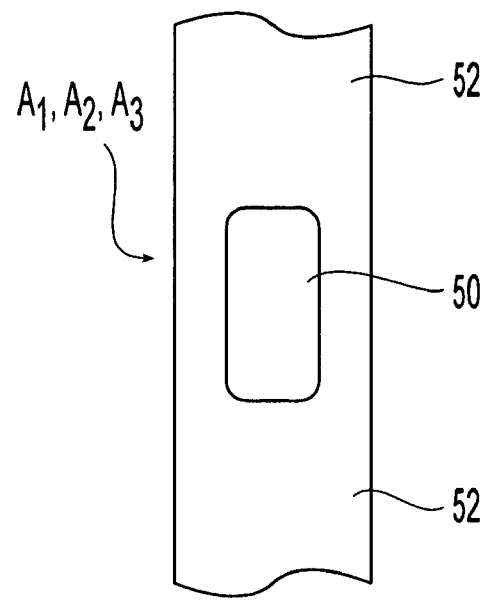
FIG. 2B is a side view of a second exemplary embodiment of a second perimetral portion of the mine bolt of FIG. 2 having a non-uniform thickness.
Figure 2C:
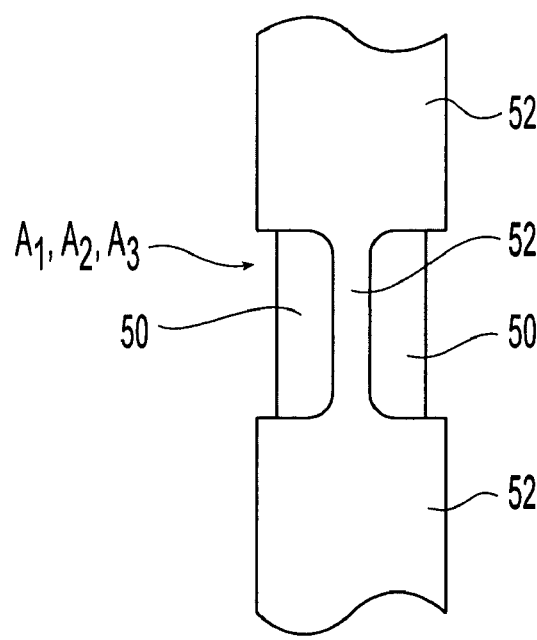
FIG. 2C is a side view of a third exemplary embodiment of a second perimetral portion of the mine bolt of FIG. 2 having a non-uniform thickness.
Figure 2D:
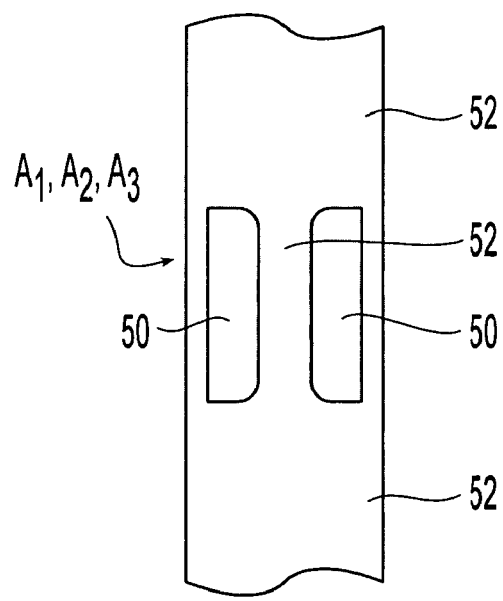
FIG. 2D is a side view of a fourth exemplary embodiment of a second perimetral portion of the mine bolt of FIG. 2 having a non-uniform thickness.

Each of the embodiments of mine roof supports of FIGS. 1 and 2 optionally may be modified to include non-uniform thickness in the form of discontinuous coatings over the longitudinal length of the supports for example to provide bend points. As shown in FIG. 2, mine bolt 40 may be provided with one or more regions $A_1$, $A_2$, $A_3$ in which the coating material may not extend completely around the bolt. In particular, second perimetral portion 52 in one or more regions $A_1$, $A_2$, $A_3$ may (1) be completely absent in one or more of regions $A_1, A_2, A_3$, (2) only extend around a portion of bolt 40 about longitudinal axis 60, (3) be substantially thinned even as compared to non-thread portions of the second perimetral portion 52, (4) be tapered in one or more regions $A_1$, $A_2$, $A_3$, or (5) be discontinuous in multiple locations within each of one or more of regions $A_1$, $A_2$, $A_3$ around bolt 40 about longitudinal axis 60. In one embodiment, a coating only extends around about 180° of bolt 40 in one or more of regions $A_1$, $A_2$, $A_3$. Thus, a reduced volume of coating material may be applied in one or more of regions $A_1$, $A_2$, $A_3$ as compared to other regions of second perimetral portion 52. For example, as shown in FIG. 2A, coating 52 is completely absent in one or more of regions $A_1$, $A_2$, $A_3$, while in FIGS. 2B-2D, coating 52 is partially absent in one or more of regions $A_1$, $A_2$, $A_3$, thus forming bridges of coating 52 or windows through the coating that expose first central portion 50. In order for a bolt 40 to be produced with one or more regions $A_1$, $A_2$, $A_3$ in which coating 52 is partially or completely absent, the bolt 40 may be suitably molded or alternatively portions of coating 52 within one or more regions $A_1$, $A_2$, $A_3$ may be removed after molding as by cutting with a rotary blade or remelting and removing by applying sufficient heat to the particular region of coating 52.

For example, if a mine bolt 40 of 4 feet in length is to be installed in a borehole in a mine roof, there must be at least 4 feet of clearance below the borehole so that bolt 40 can be maneuvered into position for insertion. If 4 feet of clearance is not available, then the bolt 40 first must be bent intermediate its ends to permit alignment of a portion of the bolt with the borehole and then partial insertion into the borehole. The bolt next may be re-bent to proximate its initial generally straight shape for insertion of the final portion into the borehole. To facilitate such bending, regions $A_1$, $A_2$, $A_3$ may be provided as bend points at discrete locations along longitudinal axis 60. In an exemplary embodiment, at least one region $A_1$, $A_2$, $A_3$ is provided along the last half-length of the mine bolt proximate end 44. Preferably, a region $A_3$ is provided proximate about one-quarter the length of the mine bolt from end 44, thus providing a lever arm of considerable length to facilitate the bending. Such bending may be achieved by hand by a miner installing such a bolt.

Because of the generally loose tolerance for rebar, a preferred material for first central portion 50, a thin coating of polymer may occur in second perimetral portion 52 in one or more of regions $A_1$, $A_2$, $A_3$. This thin coating may be unavoidable because the mold for injection molding of second perimetral portion 52 onto first central portion 50 preferably is sufficiently sized to accommodate all possible dimensions of rebar within the given tolerance.

Figure 2E:
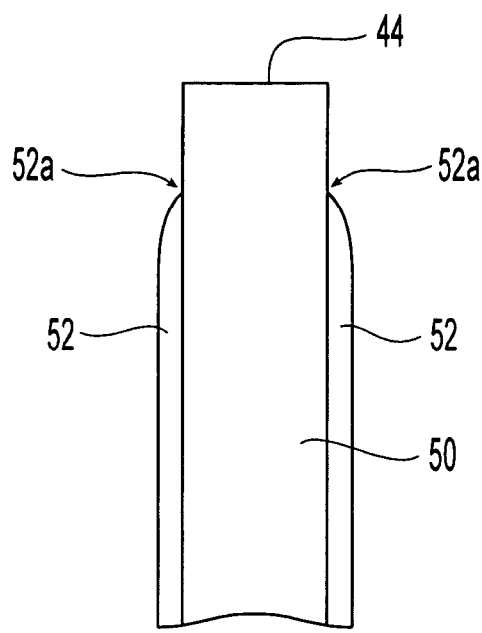
FIG. 2E is a cross-sectional side view proximate an exemplary end of the mine bolt of FIG. 2.
Figure 2F:
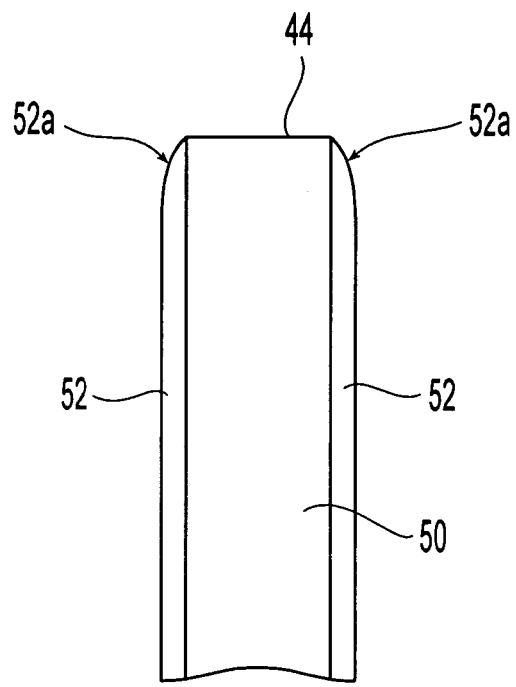
FIG. 2F is another cross-sectional side view proximate an exemplary end of the mine bolt of FIG. 2.
Figure 2G:
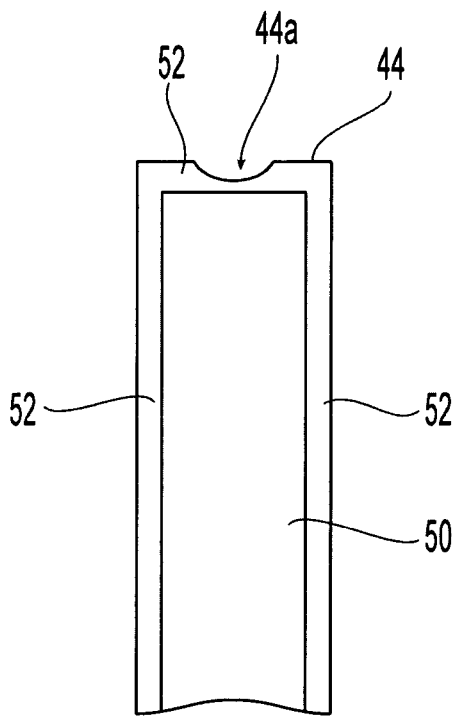
FIG. 2G is yet another cross-sectional side view proximate an exemplary end of the mine bolt of FIG. 2.
Figure 2H:
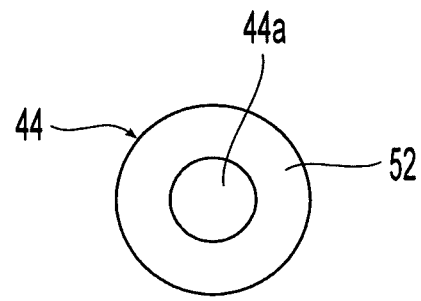
FIG. 2H is a top view of a first embodiment of the exemplary end of the mine bolt of FIG. 2.
Figure 2I:
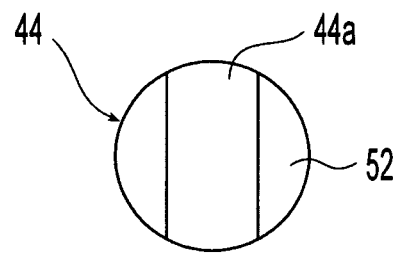
FIG. 2I is a top view of a second embodiment of the exemplary end of the mine bolt of FIG. 2.

Second perimetral portions 22, 52 may terminate prior to one or more of ends 14, 44 of mine bolts 10, 40, respectively, as shown in FIGS. 1-2, or optionally second perimetral portions 22, 52 may extend completely to one or more of ends 14, 44 of mine bolts 10, 40. A variety of structures are anticipated proximate ends 14, 44 in accordance with the present invention. Referring to FIG. 2E, coating 52 does not extend completely to end 44, and includes a rounded edge 52a which may facilitate insertion of the mine bolt into a borehole. As shown in FIG. 2F, coating 52 extends completely to end 44 and also includes a rounded edge or lip 52a which may facilitate insertion of the mine bolt into a borehole. In preferred exemplary embodiments, end 44 may be completely flat to easily support a resin cartridge thereon during insertion of both components together into a borehole, or may include one or more flat portions for this purpose. In FIG. 2G, coating 52 encapsulates a free end of first central portion 50 and includes a depression 44a therein which may take the form of a cup as shown in FIG. 2H or a trough as shown in FIG. 2I. In some embodiments, depression 44a may be provided to assist in supporting a resin cartridge on end 44 during insertion of both components together into a borehole. Depression 44a, such as the cup shown in FIG. 2H, may form during cooling of coating 52 due to shrinkage thereof, and may facilitate easy release of the mine bolt from the mold cavity after molding is complete.

In order for ends 12, 14 of bolt 10 and ends 42, 44 of bolt 40 to be free of second perimetral portions 22, 52, respectively, first central portions 20, 50 for example may extend beyond the edges of a mold cavity during molding.

A variety of bolt lengths may be accommodated in accordance with the present invention, including bolts of about 36 inches, about 42 inches, and about 48 inches in length. Other bolt lengths as known in the art also may be accommodated.

The coated mine bolts of the present invention such as mine bolts 10, 40 may be provided with indicia for example on second perimetral portions 22, 52, respectively. The indicia may be molded onto the mine bolts at the time of molding of portions 22, 52, or alternatively may be stamped onto portions 22, 52 such as with light heat subsequent to molding, or alternatively the indicia may be scored onto portions 22, 52. Suitable indicia include product name or designation, logos or names designating the manufacturer or purchaser of the product, manufacturing information, governmental regulation compliance information, or patent marking data. Indicia that includes customer name may be desirable for marketing, and in general the indicia may improve workflow at the manufacturing location, shipping, and at the end-user site. Advantageously, such indicia is easier to include on second perimetral portions 22, 52 formed of polymer than on first central portions 20, 50 that may be formed of steel. Furthermore, indicia may be provided to permit users to easily determine the length of the bolt or the end use intended for the bolt (e.g., installation in a particular region of a mine). The polymer coatings on bolts additionally may be used to color code the bolts based on such factors as bolt length, bolt diameter, or bolt strength and thus the indicia may be in the form of color. Also, as known in the molding art, mold "inserts" may be used to readily change the indicia to be formed on different bolts manufactured using the same molds, as will be described herein.

In one preferred exemplary embodiment of the present invention, second perimetral portions 22, 52 may be provided with thicknesses between about 1/16 inch and about 3/4 inch. More preferably, second perimetral portions 22, 52 may be provided with thicknesses between about 0.1 inch and about 0.5 inch. Coatings proximate texturing 24, 54, thread portions 26, 28, and continuous thread 56 preferably may be about twice the thickness of the coating adjacent thereto.

Further characteristics potentially applicable to each of exemplary mine bolts 10, 40 are described in detail above in the Summary of the Invention.

In accordance with the present invention, mine bolts 10, 40 may be installed in a mine roof to provide support. As discussed above, an exemplary, preferred method of supporting a mine roof includes: providing a bolt 10, 40 comprising a first central portion with a first specific gravity and a second perimetral portion with a second specific gravity and disposed on the first portion and having protruding inclined surfaces thereon, with the second specific gravity being substantially lower than the first specific gravity, and wherein the second perimetral portion has a maximum thickness at least 1 mm; forming a borehole in the mine roof; disposing the bolt in the borehole; grouting the bolt in the borehole such that the bolt supports a load of ten tons with less than ½ inch deflection of the heads 12, 42 of the respective bolts 10, 40 in a 12 inch anchored length.

In accordance with another method of the present invention, mine bolts 10, 40 may be installed in a mine roof to provide support following a method including: providing a bolt 10, 40 comprising a first central portion with a first specific gravity and a second perimetral portion with a second specific gravity and disposed on the first portion and having protruding inclined surfaces thereon, with the second specific gravity being substantially lower than the first specific gravity, and wherein the second perimetral portion has a maximum thickness at least 1 mm; forming a borehole in the mine roof with one closed end; inserting a vessel containing grout into the borehole; inserting the bolt into the borehole; puncturing the vessel with the bolt so that grout is released from the vessel; rotating the bolt in the borehole so that the released grout is distributed toward the closed end of the borehole by the protruding inclined surfaces. The protruding inclined surface may be in the form of thread portions or threading as described with respect to FIGS. 1 and 2. By rotating the bolt 10, 40, frictional heating of the grout may occur, and the frictional heating may be sufficient to substantially accelerate curing thereof. Also, when the bolt 10, 40 is rotated, the grout may be simultaneously mixed and distributed toward the closed end of the borehole.

In accordance with another method of the present invention, mine bolts 10, 40 may be installed in a mine roof to provide support following a method including: forming a borehole in the mine roof with one closed end, the borehole having a borehole maximum width; providing a bolt 10, 40 comprising a first material with a first specific gravity; coating the bolt with a second material with a second specific gravity so that the shaft of the bolt has a maximum width no more than 6 mm smaller than the borehole maximum width; forming protruding inclined surfaces with the second material; inserting a vessel containing grout into the borehole; inserting the bolt into the borehole; puncturing the vessel with the bolt so that grout is released from the vessel; rotating the bolt 10, 40 in the borehole so that the released grout is distributed toward the closed end of the borehole by the protruding inclined surfaces. In an exemplary embodiment, the bolt maximum width may be more than the borehole maximum width.

In another method of supporting a mine roof with a bolt 10, 40, the method includes the steps of: creating a hole between 0.75 inch and 1⅜ inches in diameter in a mine roof; inserting a receptacle holding a volume of resin into the hole; inserting a textured member 10, 40 into the hole, the textured member 10, 40 having a first central portion with a first specific gravity and a second perimetral portion with a second specific gravity lower than the first specific gravity and disposed on the first portion; penetrating the receptacle with the textured member to release resin from therein, with the second perimetral portion displacing at least about 30% of the resin volume as compared to a bolt without a second perimetral portion 22, 52. Resin volume is defined as the volume of resin to fill the annulus between the bolt and the borehole. The method may further include articulating the textured member 10, 40 in the receptacle to shred the receptacle. Also, the method may further include articulating the textured member 10, 40 in the receptacle to mix the resin. And, the method may further include allowing the resin to cure to secure the textured member 10, 40 in the hole.

In each of the exemplary methods described above, the vessel containing the grout may be shredded. Exemplary, non-limiting vessel designs appropriate for use with the present invention are disclosed in U.S. Pat. Nos. 3,861,522 and 4,239,105, each of which is incorporated herein by reference thereto. Exemplary, non-limiting grouting compositions are disclosed in U.S. Pat. No. 6,545,068 B1, which also is incorporated herein by reference thereto.

In order to manufacture a bolt 10, 40, the following method may be applied: coating a central metal member with a flowable polymer so that the coating has a maximum thickness of at least 1 mm; allowing the polymer to solidify on the central metal member; texturing the polymer. The coating step may include dip coating, injection molding and/or hot forging.

With respect to each of bolts 10, 40, by applying a preferably low density, hard coating to the outside surface of a mine roof support bolt, the overall diameter of the bolt may be increased with a proportional decrease in weight. Specifically, a coating of a material such as a polymer has substantially lower mass per unit volume as compared to a metal such as steel used to form the bolt. Furthermore, while realizing the weight advantages of polymers as compared to metals, such a composite bolt can advantageously be sized to provide improved mixing of resin by permitting a smaller annulus between the bolt and the rock of the hole.

Advantageously, such a reduced annulus size may concomitantly provide reduced size of shredded resin packaging film after mixing.

More preferably, the coating has a specific gravity that is substantially lower than that of steel and preferably lower than that of the resin grout. Furthermore, it is preferable that the coating substantially preserve the surface texture of the bolt, thus facilitating mixing and shredding in smaller annulus systems. The thickness of the coating preferably is enough so that the annulus between the bolt coating and borehole is less than ⅛ inch and more preferably less than 1/16 inch. The overall weight of the mine bolt system, therefore, may be substantially reduced, particularly if the coating is formed of a polymer with a density of about 2.0 g/cc or less. In a preferred embodiment, the coating density is at least about 20% less than the resin density, and more preferably the coating density is between about 40% and about 70% less than the resin density.

In one preferred embodiment, the coating has equal or superior shear strength to the cured resin grout, typically between about 4000 psi and about 6000 psi. Overall, therefore, such a bolt may provide improved strength/load performance, particularly when recycled or virgin PET is used to form the coating. Recycled PET is widely available on the market and inexpensive particularly compared to the steel that forms the bolt as well as the resin.

In another preferred embodiment, the coating preferably is applied so that the coating is thicker at the end remote from the head of the bolt and comparatively thinner at the end with the bolt head so as to form a slight taper that will form a mechanical wedge as load is applied to the bolt head.

Also, the coating preferably has a low thermal conductivity to permit heat to be absorbed from the exothermic reaction of the resin and catalyst as well as a faster cure than otherwise with an uncoated bolt.

Preferably, the coating is between about ⅙ inch thick and ¼ inch thick. Advantageously, the coating may be filled with sand or limestone. Sand offers an advantage in strength over limestone, while limestone may be used as a filler in resin systems because it is much less abrasive than sand. Also, the high abrasion of sand presents difficulties with incorporation into the automatic packaging machines and pumps that are typically used by resin capsule manufacturers. However, fillers that permit a gritty surface to be formed with the polymer coating advantageously may assist with shredding of the resin capsule. Other fillers that may be incorporated with a polymer coating include aluminum, paper, Kevlar fibers, glass fibers, zeolite, and other inert or active materials that may enhance the strength of the polymer.

Improved corrosion resistance may be realized with coated bolts as compared to uncoated bolts, for example, because the coating may inhibit rust.

In a preferred, exemplary embodiment, a ⅝ inch bolt formed of rebar is coated with PET and grouted in a 1 inch diameter hole.

Bolts may be coated with polymer, for example, by a dipping coating process in which the bolt is dipped into molten or otherwise non-solid polymer along its length preferably up to the bolt head.

Preferably, the bolt is provided with texturing and the coating on the bolt follows the texturing so that the coated bolt still has texture. In exemplary embodiments, such texturing for example may be in the form of threading, waffle patterns, or irregular surface contouring along the length of the bolt.

Texturing, for example, may be applied to the bolt due to the shape of the mold cavity in which polymer may be injected such as during injection molding of second perimetral portion 22, 52. Alternatively, the texturing may be applied subsequent to the injection molding, such as by initially forming a coating on first central portion 20, 50 and then rolling the bolt on a pattern to apply the desired texturing. In one method, the rolling occurs while the second perimetral portion 22, 52 is still heated (e.g., not thoroughly set), while in another method the rolling occurs with suitable pressure after the second perimetral portion 22, 52 has set. In some preferred molding methods according to the present invention, second perimetral portion 22, 52 preferably sets within about 30 seconds, and more preferably within about 20 seconds, of being formed on central portion 20, 50.

Alternatively, a coating may be applied to the bolt shaft by wrapping the shaft in a sheet or tube of polymer and then adhering or otherwise melting the polymer to the shaft to form a bond therebetween.

In addition, by providing a polymer coating on the bolt, the resin cartridge length advantageously may be decreased. In particular, the required volume of resin cartridge may be decreased by at least 30% by increasing the diameter of the mine bolt with the coating of polymer. More preferably, the required volume of resin cartridge may be decreased by at least 50% by the polymer coating, and even more preferably the required volume of resin cartridge may be decreased by at least 75% by the polymer coating.

By substantially decreasing the amount of resin required for grouting, resin cartridge length may be substantially shortened, thereby realizing significant reduction in cartridge bending problems. Cartridge bending is about a squared function of cartridge length. Thus, a 50% reduction in cartridge length results in about a 4-fold reduction in cartridge bending problems. Restated, by displacing 75% of the required resin volume, only one-quarter of the cartridge length is needed and the stiffness improves by a factor of about 16. Such improvements effectively eliminate cartridge stiffness as a problem in the field during bolt installation.

For example, a mining application may require that a ⅝ inch bolt be inserted in a 1 inch diameter hole. The bolt may be about 4 feet, about 6 feet or even about 20 feet in length. If a 4 foot long bolt is used, a hole of about 50 inches in length is typically drilled. Prior art resin cartridges used with such hole and bolt lengths may for example extend 40 inches. At such a length, the cartridge becomes limp and thus difficult to insert in the hole with the bolt. Concomitantly, when the resin is released from its packaging to flow in the hole and anchor the bolt, substantial lengths of the resin may remain unmixed and thus provide less anchoring than desired. By decreasing the required length of resin cartridge, such a problem may be avoided.

As the volume of resin displaced by the polymer coating is increased, improvements may be realized in terms of: bolt system cost, decreased cartridge limpness, reduced bolt system weight, enhanced mixing and tearing of the resin cartridge, and increased strength (less deflection for same load). In addition, faster bolt installation may be realized by providing more friction possibly through interference fit of the bolt in a hole in rock. In particular, the resin may set faster because when the bolt is spun in place in the resin, the friction may result in an elevated temperature of the resin. Also, a polymer coating forming second perimetral portion 22, 52 would have lower thermal conductivity than a metal member forming first central portion 20, 50, and thus less heat is absorbed by the bolt and more heat is absorbed by the surrounding resin.

Experimentation was performed to determine the performance of coated mine bolts in accordance with the present invention. In a first series of experiments, shown graphically in FIGS. 3 and 4, all mine bolts were dip-coated so as to produce a bolt with a maximum outside diameter of an uninterrupted thread of polymer of about 0.90 inch and an effective average diameter of about 0.80 inch on a #5 grade 60 rebar with an effective average diameter of about 0.62 inch. For a control, uncoated #5 grade 60 rebar was used. The coated bolts in FIG. 3 were coated with PET having a Kevlar filler of about 10 wt % to about 15 wt %, while the coated bolts in FIG. 4 were coated with PET having a sand filler of about 10 wt % to about 15 wt %. In a second series of experiments, shown graphically in FIG. 5, all mine bolts were coated in a mold by injection molding so as to produce a bolt with a maximum outside diameter of an interrupted thread of polymer of about 0.875 inch and an effective average diameter of about 0.78 inch on a #5 grade 60 rebar with an effective average diameter of about 0.62 inch. For comparison with sample bolts coated with PET having a cement filler of about 10 wt % to about 15 wt %, uncoated #5 grade 60 rebar, polymethylmethacrylate (PMMA) coated bolts, and PET-coated bolts were used.

All samples were prepared by inserting the bolts into a steel borehole with an inside diameter of about 1.0625 inch, an outside diameter of about 1.25 inch, and about 7 inches in length. One end of the borehole was closed with a steel cap, providing approximately 6 inches of bolt grouted length. The inside of the borehole was threaded to provide consistent interfacial strength between the resin grout and borehole wall.

Resin grout from the same box of commercial medium speed resin was used for all tests. The bolt was spun at 360 RPM for 4 seconds after the bolt was fully inserted into the borehole. After a minimum of 10 minutes to allow the resin to fully cure, the bolt and borehole were placed in a hydraulic pull apparatus that measures deflection of the bolt head as function of the load placed on the bolt. Deflections and load were electronically recorded and plotted.

The maximum diameter was measured with vernier calibers and the average effective diameter was measured by volumetric water displacement.

Figure 3:
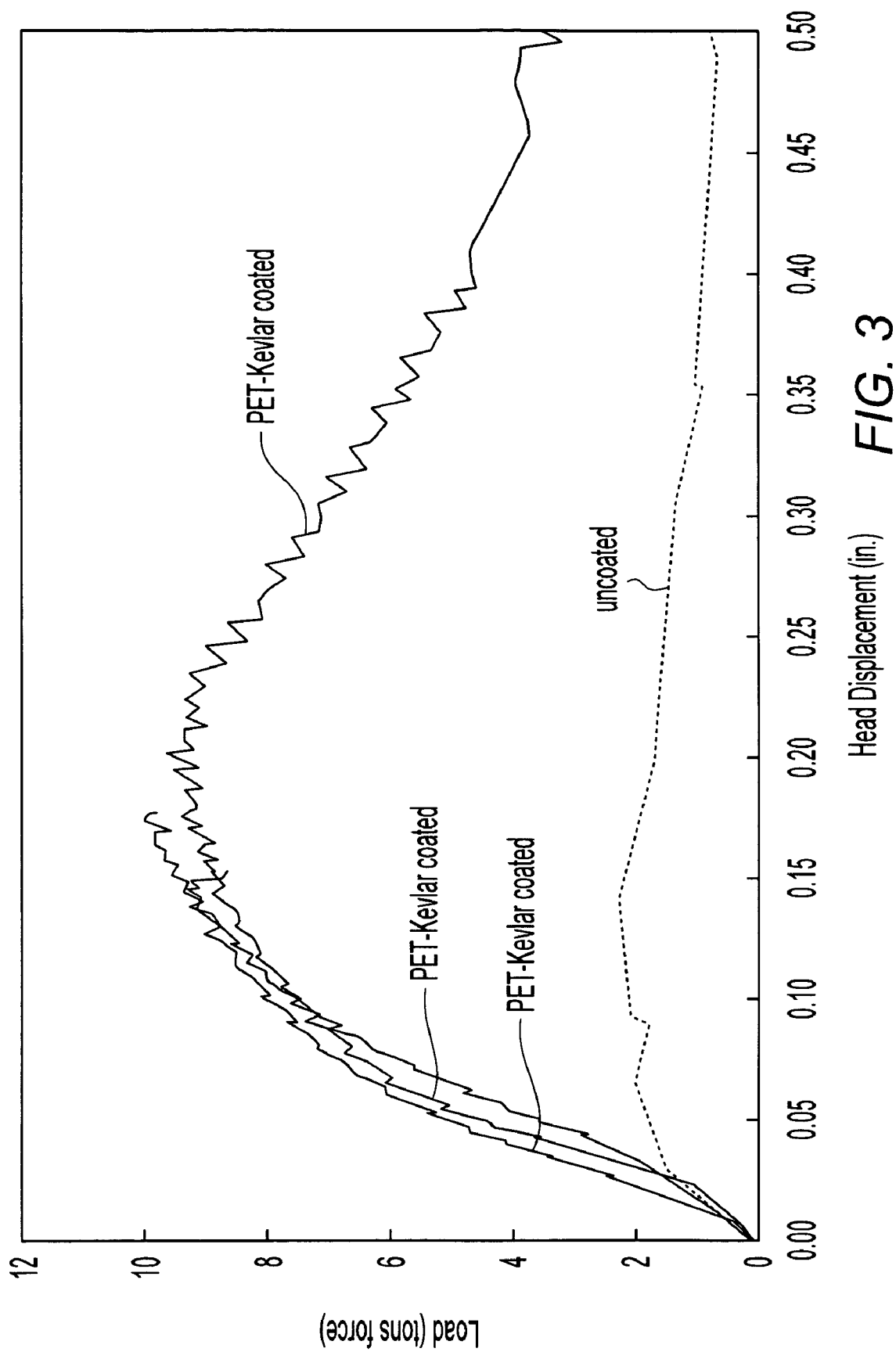
FIG. 3 is a graph showing load as a function of head displacement for tests of dip-coated mine bolts coated with PET-Kevlar.
Figure 4:
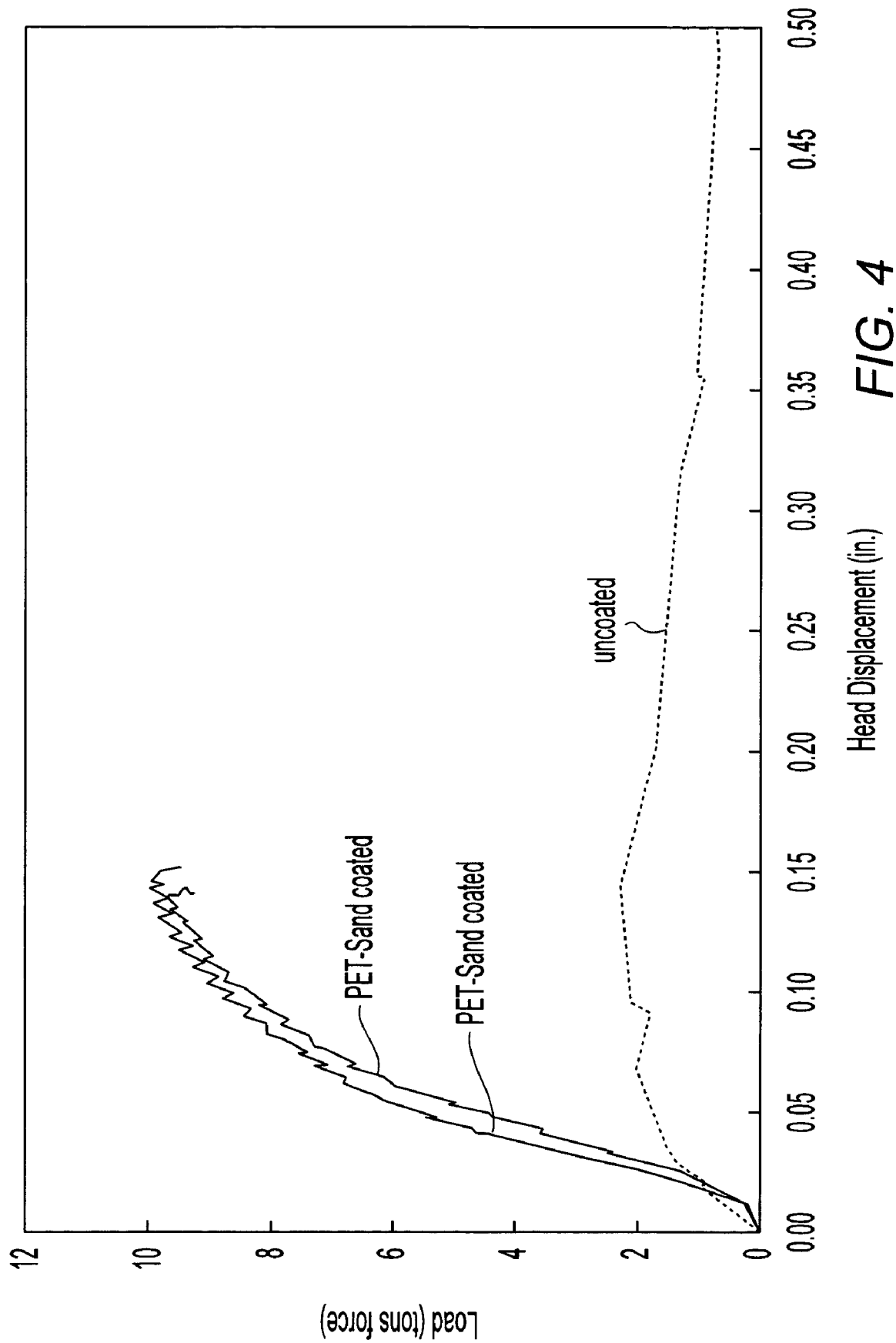
FIG. 4 is a graph showing load as a function of head displacement for tests of dip-coated mine bolts coated with PET-Sand.

With reference to FIGS. 3 and 4, showing plots of load (in tons of force) as a function of head displacement (in inches), coatings of both PET-Kevlar mixtures and PET-sand mixtures provided substantially enhanced performance.

Figure 5:
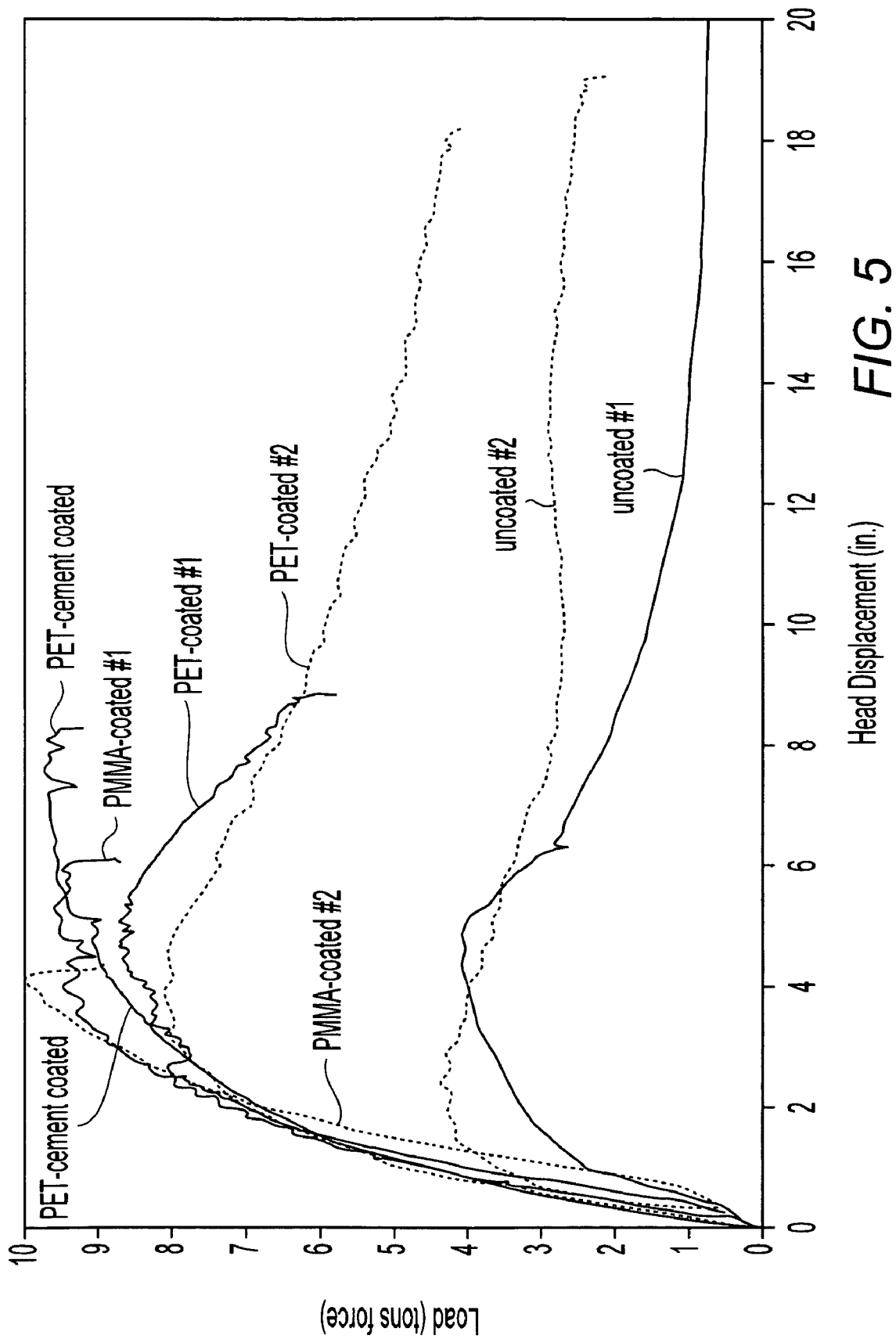
FIG. 5 is a graph showing load as a function of deflection for tests of injection mold coated mine bolts coated with PET-Cement.

With reference to FIG. 5, showing a plot of load (in tons of force) as a function of head displacement (in mm), a coating of a PET-cement mixture provided substantially enhanced performance.

For reference, typically, grouted mine bolts must hold 20,000 pounds of force with 12" of anchorage.

Some bolts according to the present invention may have coatings of polymer that are either amorphous, semi-crystalline, or layers both of amorphous and semi-crystalline polymer. In one preferred exemplary embodiment, a semi-crystalline layer may be formed proximate the outer surface of the metal member of the bolt to provide a high strength layer that may have improved adhesion to the metal member as compared to an amorphous layer. The metal member additionally may be provided with an amorphous layer remote from the outer surface of the metal member, and preferably at the outermost surface of the coated bolt, to provide more toughness as compared to the semi-crystalline layer. Thus, a coating may be provided with both strength and ductility. Such a semi-crystalline layer would provide generally brittle behavior up to about 70° C., while the amorphous layer would provide generally ductile behavior over that temperature range.

In one preferred exemplary embodiment, the crystallinity of the polymer coating on the metal member is lower proximate the outermost surface of the finished, coated bolt than proximate the outer surface of the metal member, so that the material with higher crystallinity and thus more brittle properties is disposed remote from the outermost surface of the finished, coated bolt. Moreover, it is desirable to have a layer of increased crystallinity proximate the metal member because such a layer may have a higher tensile strength and elastic modulus than the layer of lower crystallinity proximate the outermost surface of the finished, coated bolt.

In one preferred exemplary embodiment of a coated bolt according to the present invention, an elongate metal member is coated at least in part with a coating of PET that includes a first layer having a crystallinity between about 16% and about 30%. In one preferred exemplary embodiment, the first layer has a thickness at least about 0.1 mm and is formed proximate the outer surface of the metal member of the bolt. Optionally, the coating of PET may include a second layer having a crystallinity between about 6% and about 14%. Preferably, the second layer has a thickness at least about 0.1 mm. The second layer preferably is formed remote from the outer surface of the metal member of the bolt, and in the preferred exemplary embodiment may be formed at the outermost surface of the coated bolt.

In another preferred exemplary embodiment of a coated bolt according to the present invention, an elongate metal member is coated at least in part with a coating of PET that includes a first layer having a crystallinity between about 16% and about 28%. In one preferred exemplary embodiment, the first layer has a thickness at least about 0.1 mm and is formed proximate the outer surface of the metal member of the bolt. Optionally, the coating of PET may include a second layer having a crystallinity between about 8% and about 12%. Preferably, the second layer has a thickness at least about 0.1 mm. The second layer preferably is formed remote from the outer surface of the metal member of the bolt, and in the preferred exemplary embodiment may be formed at the outermost surface of the coated bolt.

In yet another preferred exemplary embodiment of a coated bolt according to the present invention, an elongate metal member is coated at least in part with a coating of PET that includes a first layer having a crystallinity between about 16% and about 26%. In one preferred exemplary embodiment, the first layer has a thickness at least about 0.1 mm and is formed proximate the outer surface of the metal member of the bolt. Optionally, the coating of PET may include a second layer having a crystallinity between about 8% and about 12%. Preferably, the second layer has a thickness at least about 0.1 mm. The second layer preferably is formed remote from the outer surface of the metal member of the bolt, and in the preferred exemplary embodiment may be formed at the outermost surface of the coated bolt.

In yet another embodiment of a coated bolt according to the present invention, an elongate metal member is coated at least in part with a coating of PET that includes a first layer having a crystallinity of at least about 30%. In one preferred exemplary embodiment, the first layer has a thickness at least about 0.1 mm and is formed proximate the outer surface of the metal member of the bolt. Optionally, the coating of PET may include a second layer having a crystallinity of about 28% or lower. Preferably, the second layer has a thickness at least about 0.1 mm. The second layer preferably is formed remote from the outer surface of the metal member of the bolt, and in the preferred exemplary embodiment may be formed at the outermost surface of the coated bolt. Optionally, the coating of PET may include a third layer having a crystallinity of at least about 30% or a crystallinity of about 28% or lower. Preferably, the third layer has a thickness at least about 0.1 mm and is formed at the outermost surface of the coated bolt.

Thus, a coating may include alternating layers having crystallinity of at least about 30% or crystallinity of about 28% or lower. The outer surface of the bolt may be adjacent a layer having crystallinity of at least about 30% or crystallinity of about 28% or lower. In a preferred embodiment, the thickness of each layer of the coating may be at least 0.1 mm, at least 0.2 mm, or at least 1 mm.

Figure 5A:
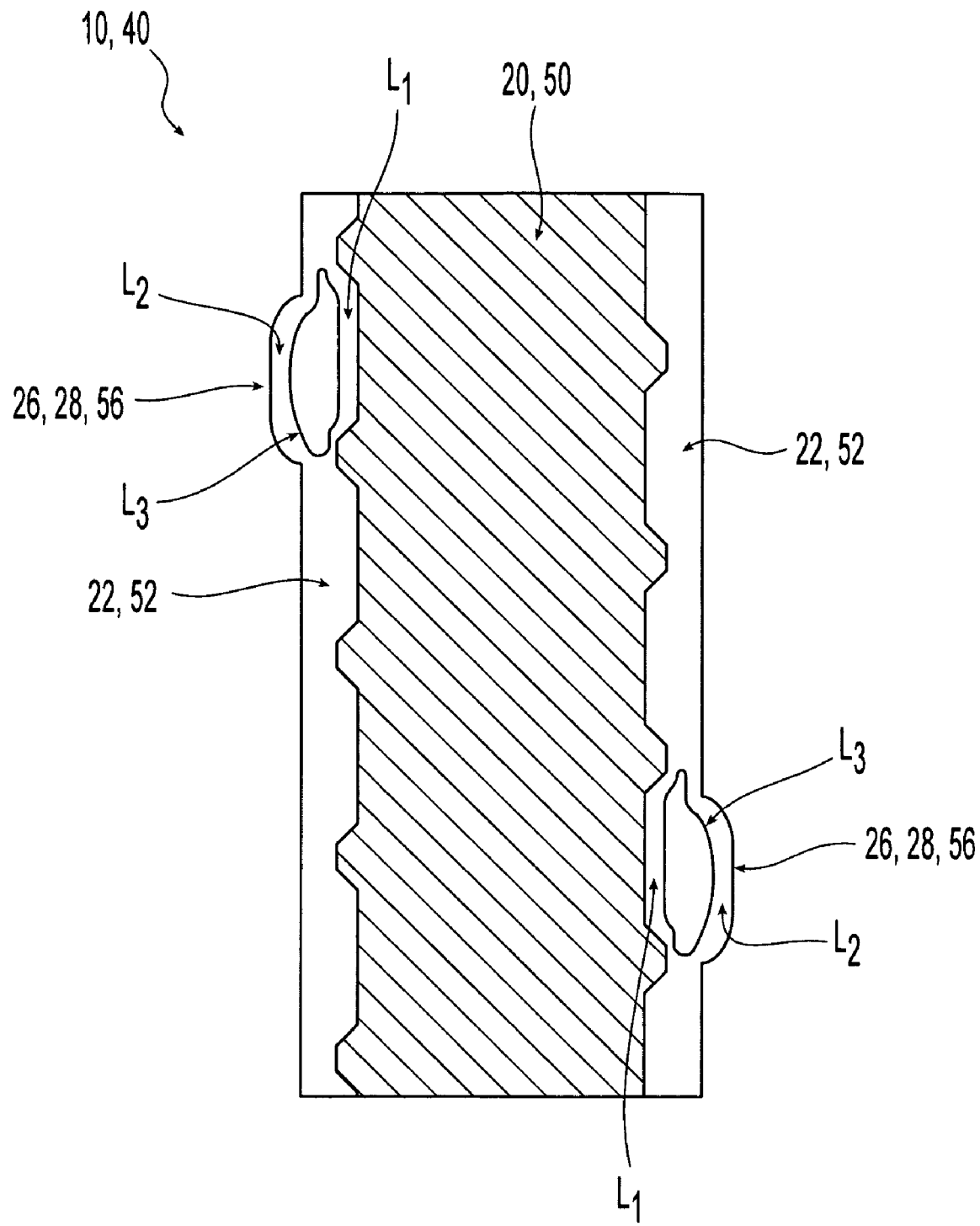
FIG. 5A is a partial cross-sectional side view of a bolt of FIG. 1 or 2.

In a method of manufacturing a polymer-coated mine bolt of the present invention, a mold that forms a mold cavity is water cooled to have a temperature T1. A metal bolt with a temperature T2 is inserted into the cavity. Polymer is injected into the cavity at a temperature substantially higher than temperatures T1, T2. As shown for example in FIG. 5A, a bolt 10, 40 includes a first central portion 20, 50 formed for example of steel and a second perimetral portion 22, 52 formed for example of PET. As a result of the faster cooling of the polymer proximate the metal bolt and proximate the inner wall forming the mold cavity, the finished coated bolt may have (1) a first coating layer proximate the outer surface of the metal member and having a first crystallinity (e.g., layer $L_1$), (2) a second coating layer proximate the outermost surface of the coated bolt and having a second crystallinity (e.g., layer $L_2$), and (3) a third coating layer between the first and second layers and having a third crystallinity (e.g., layer $L_3$). The first crystallinity is less than the third crystallinity, and the second crystallinity is less than the third crystallinity. The layers having different crystallinity are shown in exemplary regions of second perimetral portion 22, 52 proximate texturing 26, 28, 56.

In another method of manufacturing a polymer-coated mine bolt of the present invention, a mold that forms a mold cavity is water cooled to have a temperature T1. A metal bolt is preheated or otherwise provided with a temperature T2 and is inserted into the cavity. Temperature T2 is greater than temperature T1. As a result of the faster cooling of the polymer proximate the inner wall forming the mold cavity, the finished coated bolt may have (1) a first coating layer proximate the outer surface of the metal member and having a first crystallinity, (2) a second coating layer proximate the outermost surface of the coated bolt and having a second crystallinity. The first crystallinity is higher than the second crystallinity. Advantageously, injection molding particularly of longer lengths of metal bolts may be facilitated because the injected polymer may flow more easily along the length of the pre-heated bolt prior to solidifying.

As is known in the art, crystallinity as referred to herein is determined by differential scanning calorimetry (DSC) analyses (e.g., using a DuPont 9900 thermal analysis system) following the definitions in the ASTM D3417 and D3418 codes. Also, crystallinity for PET is obtained in relation to a hypothetically 100% crystalline polymer, with a fusion enthalpy of 140.1 J/g. See, e.g., Mancini, Sandro Donnini and Zanin, Maria, "Recyclability of PET from Virgin Resin," *Materials Research*, Vol. 2, No. 1 (1999), pp. 33-38; and *Advanced Thermal Analysis Laboratory*, Table of properties of linear macromolecules and small molecules, University of Tennessee, Knoxville. Each of these publications, including the ASTM standards, is incorporated herein by reference for the substance of what it discloses.

The present invention contemplates the use of both virgin and post-consumer recycled polymers. "Virgin" material is defined as material that has not yet been processed into a consumer item. With the widespread availability of recycling, many polymers now are readily available in "post-consumer" forms. "Post-consumer recycled" material is defined as finished material that would ordinarily be disposed of as a solid waste, having reached its intended end-use and completed its lifecycle as a consumer item. For the purposes of the present invention, "post-consumer recycled" materials include these finished materials in their subsequently processed states, e.g., shredded or particulate forms. "Post-consumer recycled" materials further include reclaimed materials, e.g., materials derived from products recovered from any of a variety of sources. In addition, "post-consumer recycled" materials include "regrind," "floor sweeps," substandard material that a manufacturer recycles instead of being used for its intended purpose, and material purged from a manufacturing system during cleaning such as between production of batches. Preferred post-consumer materials for use with the present invention include PET and polycarbonate. PET is available as a post-consumer material, for example, due to the availability of used carbonated drink bottles made therefrom. Polycarbonate, in particular, is available as a post-consumer material for use with the present invention due to the availability of used compact discs (CDs). CDs typically are formed of polycarbonate with an aluminum layer. In instances in which polycarbonate is used in the present invention to form a coating on a bolt, the coating optionally may include about 1% or less of metal by weight of polymer therein, and the metal may be aluminum. Also, other polymers used to form bolt coatings optionally may be combined with metal that is provided in flake, powder, foil, or other form.

The PET used in the present invention may be formed of homopolymers and/or copolymers. A homopolymer of PET is known to consist of ethylene glycol and terephthalic acid repeat units, while a copolymer of PET is known to consist of additional monomers, such as isophthalic acid which disrupt the polymer chains. The homopolymer material has the highest melting point and strength properties, while the copolymer material has a lower melting point, slower crystallization, and improved clarity in high wall thickness applications. The copolymer material also may have more desirable melt flow properties during injection molding.

Advantageously, when a bottle formed for example of one or more of PET, nylon, and PEN is recycled, the post-consumer material includes the label(s) typically applied to the bottle. Such labels may be formed of a polyolefin film with a metallic, preferably aluminum foil, thereon. The polyolefin film, for example, may be polyethylene or polypropylene having a specific gravity less than one and a dispersible adhesive thereon.

Post-consumer recycled Digital Versatile Discs (DVDs) also may be used to form second perimetral portions 22, 52. DVDs are formed of materials such as polycarbonate, PMMA, and layers of aluminum and/or gold. Polylactide resin also may be used.

In some embodiments of the present invention, a mine roof support includes an elongate metal member and a coating comprising recycled poly(ethylene terephthalate) and about 2 wt % to about 10 wt % polyolefin disposed on the member. Preferably, such a combination of materials is premixed in the recycled material used for the coating.

In addition, polymer bottle caps may be included in the recycled material used to form the mine bolt coating, and for example may be formed with polyethylene or polypropylene being the principal material. Ethylene vinyl acetate (EVA), which for example may be the lining in the cap, also may be used in the coating.

The present invention further contemplates coating mining bolts with PET variant materials including PEN copolymers as well as PET layered with one or more of (1) ethylene vinyl alcohol (EVOH), (2) nylon, and (3) barrier coatings. Coatings formed of these materials may be derived from these materials supplied in post-consumer recycled condition.

Thus, recycled polymers materials such as recycled PET may provide numerous advantages over virgin PET. First, because polyolefin is preblended with the PET due to the presence of polyolefin labels and caps in the post-consumer material, separate blending equipment is not needed on-site to combine PET with polyolefin to produce the coating. Because the blended material may be desired, only one material must be stocked—the post-consumer material—rather than separate stocks of PET and polyolefin. The addition of polyolefin in PET fortuitously permits a tougher coating to be produced on the metal members forming the mine bolts. Second, the presence of filler materials such as aluminum particles already present in the post-consumer material may play some part in producing aesthetically pleasing bolts, such as bolts having a shiny or glossy appearance. Reflective materials such as aluminum may further permit a coating to act in a reflective manner for enhanced bolt visibility, thus permitting a coated bolt to catch light in a mine where low light presence is common. Finally, because the post-consumer material may be significantly less expensive than virgin material, cost-savings may be realized by recycling post-consumer material to form the coating on the metal member of the mine bolt.

Post-consumer recycled polymers such as PET for use with the present invention are available in a variety of forms. For example, the post-consumer recycled polymers typically are available in flake form that may be washed (to remove impurities) or dirty (unwashed). In addition, a variety of colors of post-consumer recycled polymers may be used. For example, colors such as amber/brown, clear, and/or green may be used alone or in combination.

In some embodiments substantially clear post-consumer recycled polymer is used for the bolt coating and advantageously may provide reflective properties to the outer surface of the finished bolt. Following injection molding, the clear material may be transformed to have translucent or substantially opaque properties. One processing issue associated with the use of clear post-consumer recycled polymers is that upon cooling a coating, a variation in color may be realized across the coating. For example, the cooling modes may be different on different portions of the coated bolt. A portion of a coated bolt that contacts another surface during cooling has cooling because of conduction with that surface, while other non-contacting portions of the coating cool generally by convection/radiation modes. The differential cooling rates across the bolt as a function of the different cooling modes result in variation in color across the bolt due to variations in crystallinity.

Similarly in principle, a coating may have slower cooling on the "inside" adjacent the surface of the member on which the coating is formed as compared to the "outside" proximate the outer surface of the finished bolt, thus the inside portion of the coating may have higher crystallization because it has more time to crystallize.

In other embodiments, amber/brown post-consumer recycled polymers are used for the coating material. Advantageously, such amber/brown materials permit coatings to be produced which have fairly consistent uniformity in color across the coated bolt. In particular, although differential cooling may occur with coatings of brown/amber post-consumer recycled polymers and thus regions of different crystallinity may be created, variations in color with these materials are less apparent to the "naked eye" than with clear post-consumer recycled polymers.

Various polyolefins are contemplated for use as coatings for the metal members of the mine bolts disclosed herein, including polyethylene, polypropylene, polybutene, and copolymers thereof.

Injection molding a poly(ethylene terephthalate) coating on a metal member to form a bolt can be technically complicated, especially if the metal member is very long or the PET coating is thin. In particular, in such circumstances it is difficult for the polymer to flow completely around the bolt along substantially the entire length of the bolt. The molecular weight of PET has a significant effect on the uniformity and completeness of the coating for a given injection temperature and pressure. High molecular weight PET resins are often preferable because of their toughness properties. However, it is very difficult to obtain a continuous coating of high molecular weight PET resin over a significant length of metal member because of the flow properties of such a resin. Thus, it is advantageous to form mining bolts with metal members having coatings of PET resins containing an intrinsic viscosity of no greater than about 0.75 dL/g. In summary, because intrinsic viscosity is related to the composition and molecular weight of the PET resin and is a typical indicator of PET flowability, selection of a PET resin with an intrinsic viscosity of no greater than about 0.75 dL/g advantageously permits desirable flowability to be achieved. Also, preferably by selecting a PET resin with an intrinsic viscosity of at least about 0.35 dL/g, a coating with advantageous toughness may be achieved.

Thus, in some embodiments of the present invention, an elongate metal member has a coating thereon formed, at least in part, of a polymer having an intrinsic viscosity no greater than about 0.75 dL/g and at least about 0.35 dL/g. The polymer, in a preferred exemplary embodiment, may be poly(ethylene terephthalate). As is known in the art, "intrinsic viscosity" as referred to herein is determined based on ASTM D 4603-96, "Standard Test Method for Determining Inherent Viscosity of Poly(Ethylene Terephthalate) (PET) by Glass Capillary Viscometer" and ASTM D 2857-95, "Standard Practice for Dilute Solution Viscosity of Polymers." Each of these ASTM standards is incorporated herein by reference for the substance of what it discloses.

Also, in some embodiments of the present invention, an elongate metal member of the mining bolt has a coating thereon formed, at least in part, of a first polymer having a first melt flow rate and a second polymer having a second melt flow rate at least 10% less than the first melt flow rate at about 270° C. This temperature applies to one exemplary preferred injection molding operation for use with the present invention. As is known in the art, "melt flow rate" in this context is determined by ASTM D1238-95, "Standard Test Method for Flow Rates of Thermoplastics by Extrusion Plastometer." This ASTM standard is incorporated herein by reference for the substance of what it discloses.

In the aforementioned exemplary preferred injection molding operation, an elongate metal member is placed in a mold. The member has a first temperature at an outer surface thereof. Polymer is then injected into the mold, with the mold having a second temperature on an inner surface thereof that is different from the first temperature. Preferably, the mold is colder than the member so that the second temperature is less than the first temperature. In such an arrangement, a first semi-crystalline layer of the polymer is then formed proximate the outer surface of the member particularly due to the elevated temperature of the first surface of the metal member and a first substantially amorphous layer of the polymer also is formed proximate inner surface of the mold. By having the metal member outer surface at a higher temperature than the inner surface of the mold, the PET polymer also flows along the metal member to provide a more complete and/or even coating thereon. In addition, because the inner surface of the mold is colder than the metal member when polymer is injected, the polymer sets more quickly and thus the manufacturing speed advantageously is affected.

In one preferred exemplary embodiment, the first temperature of the metal member may be at least 100° C. greater than the second temperature of the mold. For example, the first temperature may be about 130° C. and the second temperature may be about 30° C. The mold may be water-cooled to achieve such a temperature, which advantageously permits a less crystalline layer to be created on the outermost coating surface for example as compared to the coating surface proximate the metal member forming the first central portion of the bolt. In other embodiments, the first temperature may be at least 50° C. or at least 200° C. greater than the second temperature.

In some embodiments, however, the first temperature of the metal member may be less than the second temperature of the mold.

In one exemplary preferred embodiment, the first semi-crystalline layer has a thickness at least about 0.1 mm and a crystallinity between about 16% and about 30%, while the first substantially amorphous layer has a thickness at least about 0.1 mm and a crystallinity between about 6% and about 14%. In an alternate embodiment, the first semi-crystalline layer has a crystallinity of greater than about 30%, while the first substantially amorphous layer has a crystallinity of less than about 28%. Also, the first semi-crystalline layer may have a thickness of at least about 0.1 mm, and the first substantially amorphous layer may have a thickness of at least about 0.1 mm. The polymer at least in part may include: (1) an inhomogeneous mixture of poly(ethylene terephthalate) and polyethylene, (2) an inhomogeneous mixture of poly(ethylene terephthalate) and polypropylene, (3) an inhomogeneous mixture of polycarbonate and polyethylene, or (4) an inhomogeneous mixture of polycarbonate and polypropylene. The polymer may include first and second polymer phases that are substantially insoluble with respect to each other.

When two polymers are used, for example a combination listed above such as poly(ethylene terephthalate) and polyethylene, a fibrous structure may form on the member. For such a combination of polymers at an injection temperature of about 270° C., the polymers are not soluble with respect to each other. Thus, although the polymers will flow onto the metal member, the polymers tend to form discrete but cohesive structures during injection molding that together form a sheath around the metal member. The structures may be strand-like and thus form a fibrous structure on the metal member, and may assume narrow widths or more ribbon-like configurations. Moreover, the combination of polymers may form an interwoven structure on the member.

Figure 6:
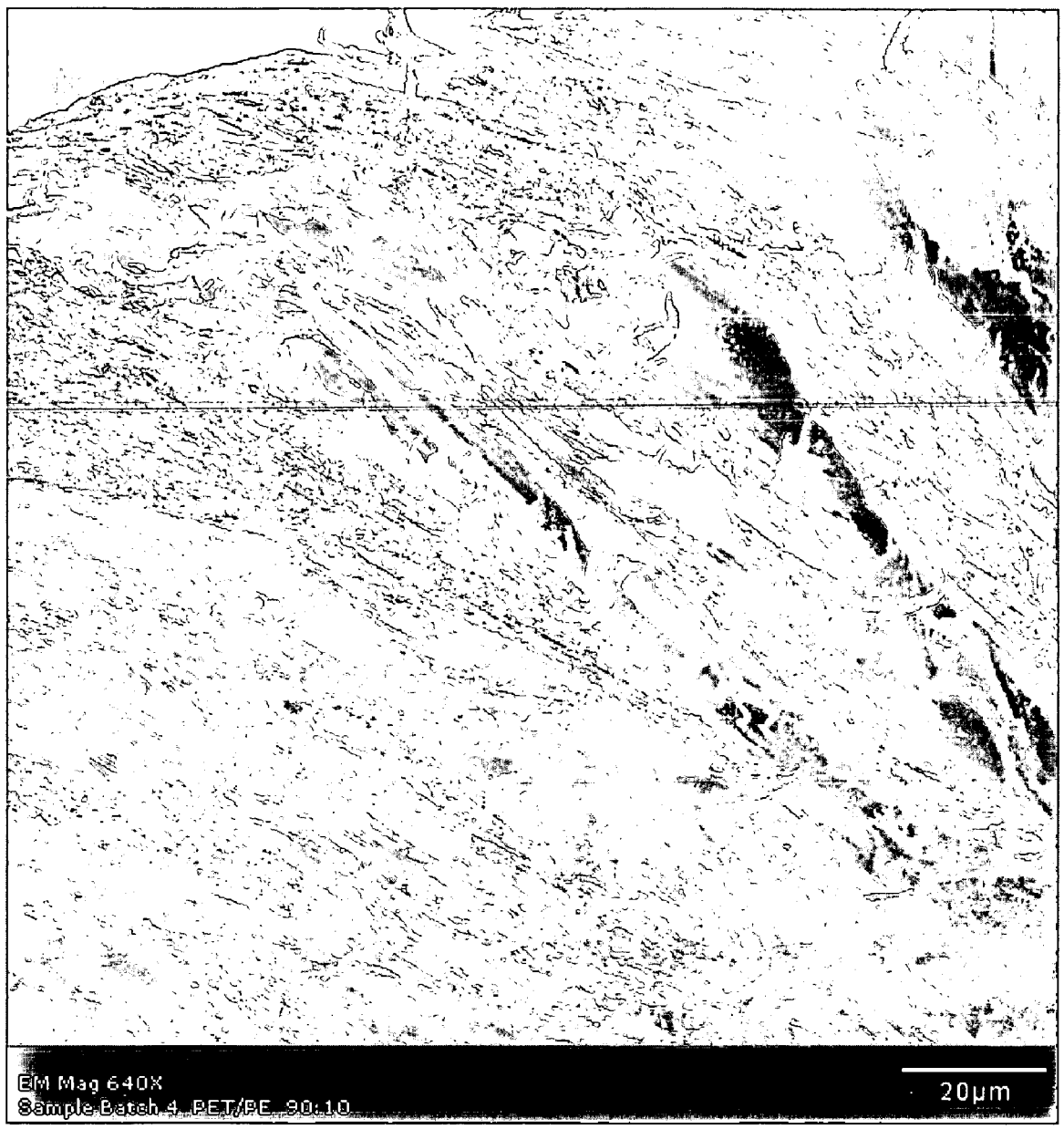
FIG. 6 shows an exemplary scanning electron micrograph of a surface of an injection molding of about 90-wt % PET and about 10-wt % polyolefin taken at 640×.

An exemplary scanning electron micrograph of a surface of an injection molding of about 90-wt % PET and about 10-wt % polyolefin is shown in FIG. 6. This image, taken at a magnification of 640×, shows a fibrous structure on the micro-scale. The injection molding was formed using a piston-type injection molding extruder that simultaneously injected the two polymers into a mold.

Figure 7:
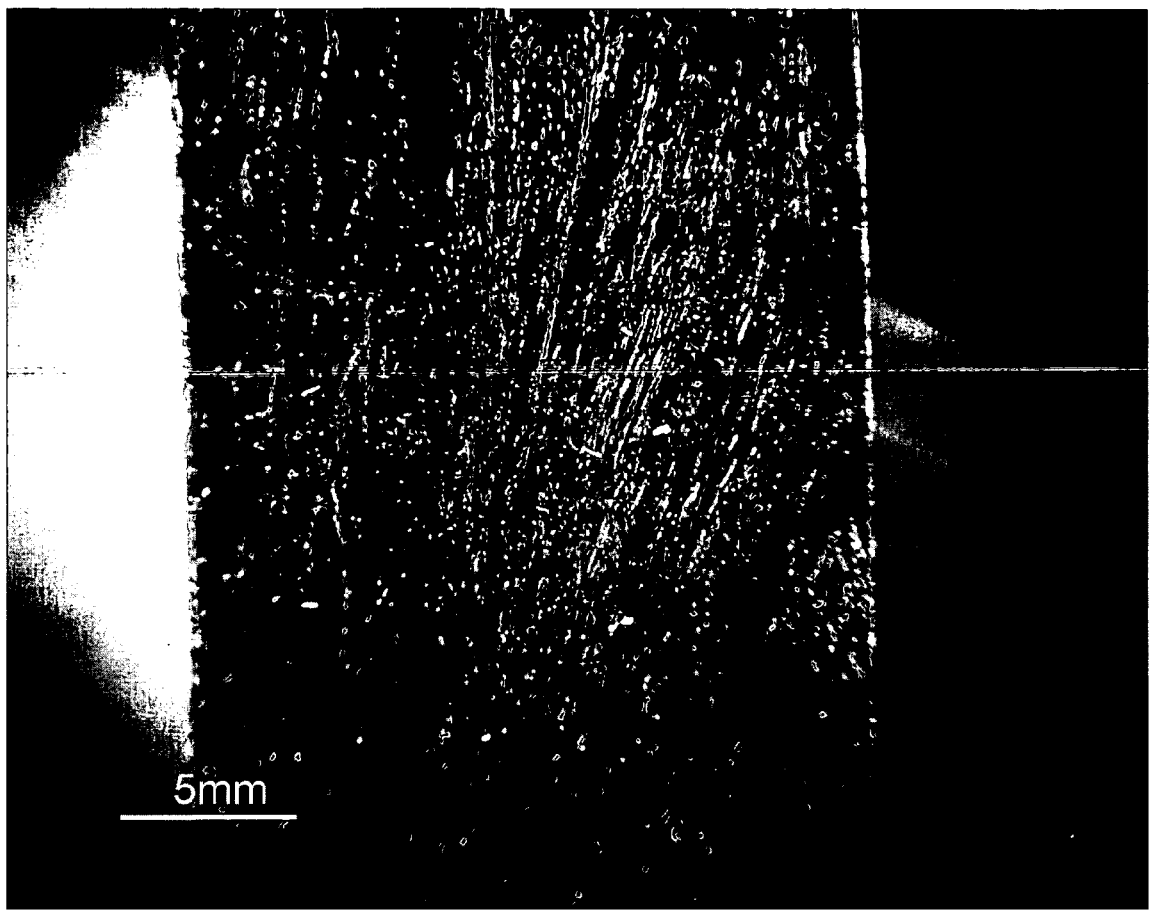
FIG. 7 shows an exemplary photograph of a surface of another injection molding of about 90-wt % PET and about 10-wt % polyolefin taken at low magnification.

An exemplary photograph from a low power microscope of a surface of another injection molding of about 90-wt % PET and about 10-wt % polyolefin is shown in FIG. 7. This picture, taken at low magnification (roughly two orders of magnitude lower magnification than the micrograph shown in FIG. 6), also shows a fibrous structure visible on the macro-scale. The injection molding again was formed using a piston-type injection molding extruder that simultaneously injected the two polymers into a mold.

Experimentation was performed to determine the crystallinity of polymer coatings on mining bolts such as those disclosed herein. In particular, each sample was formed of #5 grade 60 rebar with an effective average diameter of about 0.62 inch that was coated with PET. The PET was injection molded at about 246° C. into a mold cavity at about 25° C. and onto the rebar at an injection molding pressure greater than about 10,000 psi. Because of the difference in temperatures, the PET was essentially quenched upon contacting the surface of the mold cavity. The PET coatings had a thickness of about ⅛ inch in the thread regions formed of PET, while the PET coatings has a thickness of about 1/16 inch in non-thread regions formed of PET. The PET coatings were removed from each sample bolt in the region of a thread, and DSC plots were obtained for each coating as shown in FIGS. 8-13.

A Seiko SSC5200 DSC instrument was used with aluminum sample pans. The samples prepared from sectioned coated bolts were weighed to an accuracy greater than 0.01 mg. The tests were carried out under an atmosphere of dry nitrogen with a heating rate of 10° C./min from 30° C. to 300° C. DSC data was collected every 0.2 second during sample heating. Computer recorded thermograms were used to determine the heat of crystallization ($H_{cryst}$) and the heat of melting ($H_{melt}$). Crystallinity, K, measured in percent (%) was determined in relation to a hypothetically 100% crystalline polymer with a fusion enthalpy of 140.1 J/g ($H_{theory}$) according to Equation 1:

$$K = [(H_{melt} - H_{cryst})/H_{theory}] * 100.$$  Eq. 1

For crystallinity of PET polymers, the testing followed the method described in: Daw-Ming Fann et al., "Kinetics and Thermal Crystallinity of Recycled PET. II. Topographic Study on Thermal Crystallinity of the Injection-Molded Recycled PET," *Journal of Applied Polymer Science* 61 (1996), p. 261-271. This publication is incorporated herein by reference for the substance of what it discloses. However, the testing departed from the method of Fann et al. inasmuch as the samples were not kept under vacuum, the temperature range was slightly different, and the $H_{theory}$ was slightly different (140.1 J/g was used instead of 145 J/g).

The DSC data was used to determine crystallinity for each coating as described in Table I, with crystallinity determined by DSC analyses as described above. Table I below lists exemplar test data:

TABLE I

| Test | Material Used for Injection Molding | Location of Measurement | Sample Mass (mg) | Crystallinity (%) |
|---|---|---|---|---|
| A | clear PET flakes (washed; caps and labels removed) | Outer surface of PET coating in region of a thread | 11.162 | 9.55 |
| B | clear PET flakes (washed; caps and labels removed) | Middle of PET coating (depth of about 1 mm) in region of a thread | 10.764 | 24.47 |
| C | Multi-color PET flakes (dirty; caps and labels included) | Outer surface of PET coating in region of a thread | 11.878 | 8.07 |
| D | Multi-color PET flakes (dirty; caps and labels included) | Middle of PET coating (depth of about 1 mm) in region of a thread | 13.613 | 19.67 |
| E | Amber/brown PET flakes (dirty; caps and labels included) | Outer surface of PET coating in region of a thread | 10.232 | 9.73 |
| F | Amber/brown PET flakes (dirty; caps and labels included) | Middle of PET coating (depth of about 1 mm) in region of a thread | 10.039 | 24.05 |

For each pair of tests A-B, C-D and E-F, a section of coating was removed from a coated mine bolt proximate an injection-molded thread. The thread-region was chosen for the samples because the thickness of the coating in such a region is about twice the thickness of coating in a non-thread region of the bolt. A portion of the coating at the outer surface (about 10 mg) was sectioned and then tested as representing crystallinity at the outer surface of the PET coating on the bolt (tests A, C and E). In addition, a portion of the coating approximately midway between the outer and inner surfaces of the coating (about 10 mg) was section and then tested as representing crystallinity at the middle of the PET coating on the bolt (tests B, D and F).

Figure 8:
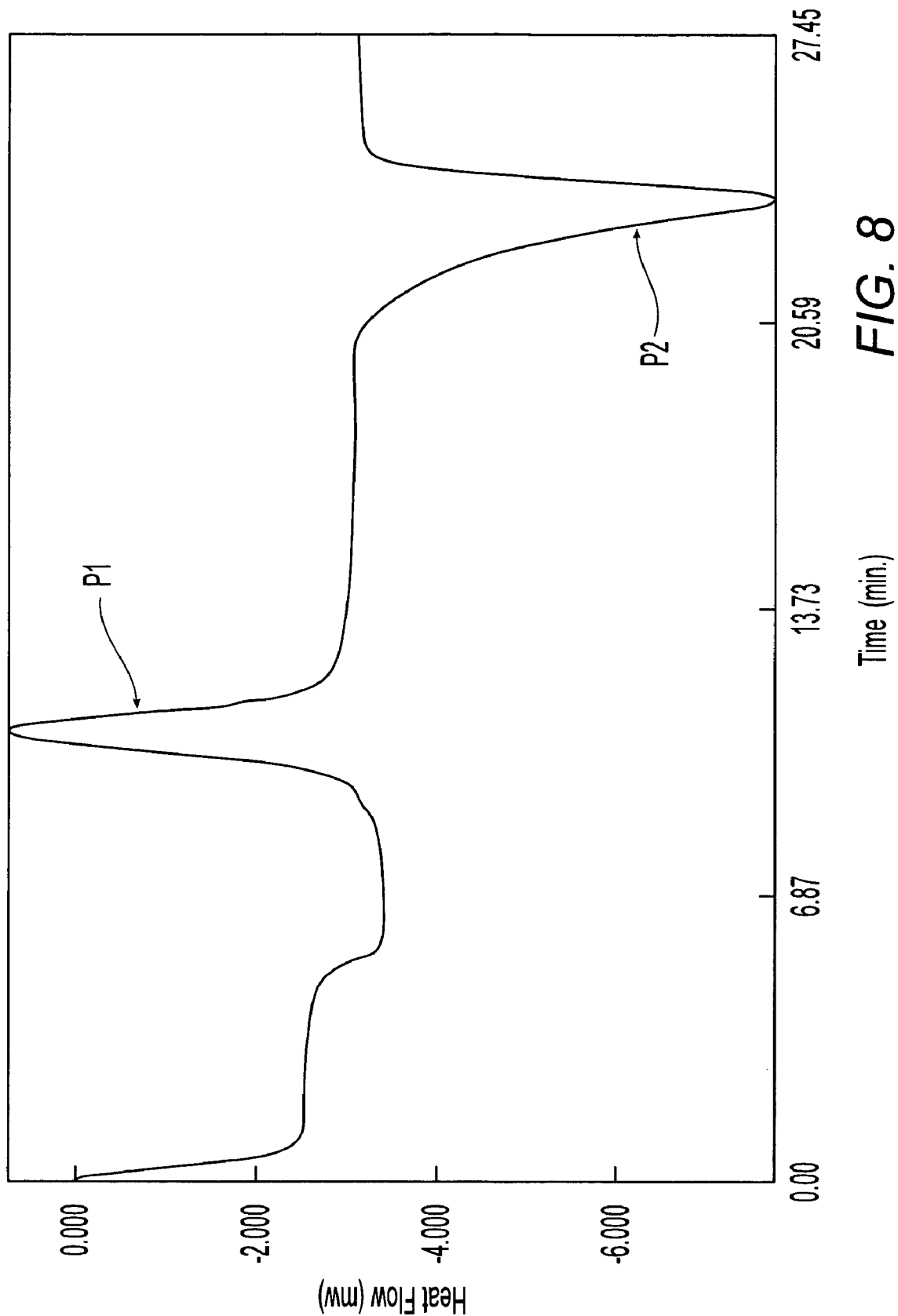
FIG. 8 is a graph of heat flow (milliwatts) as a function of time (minutes) for the outer surface of a PET coating formed from clear PET flakes.
Figure 9:
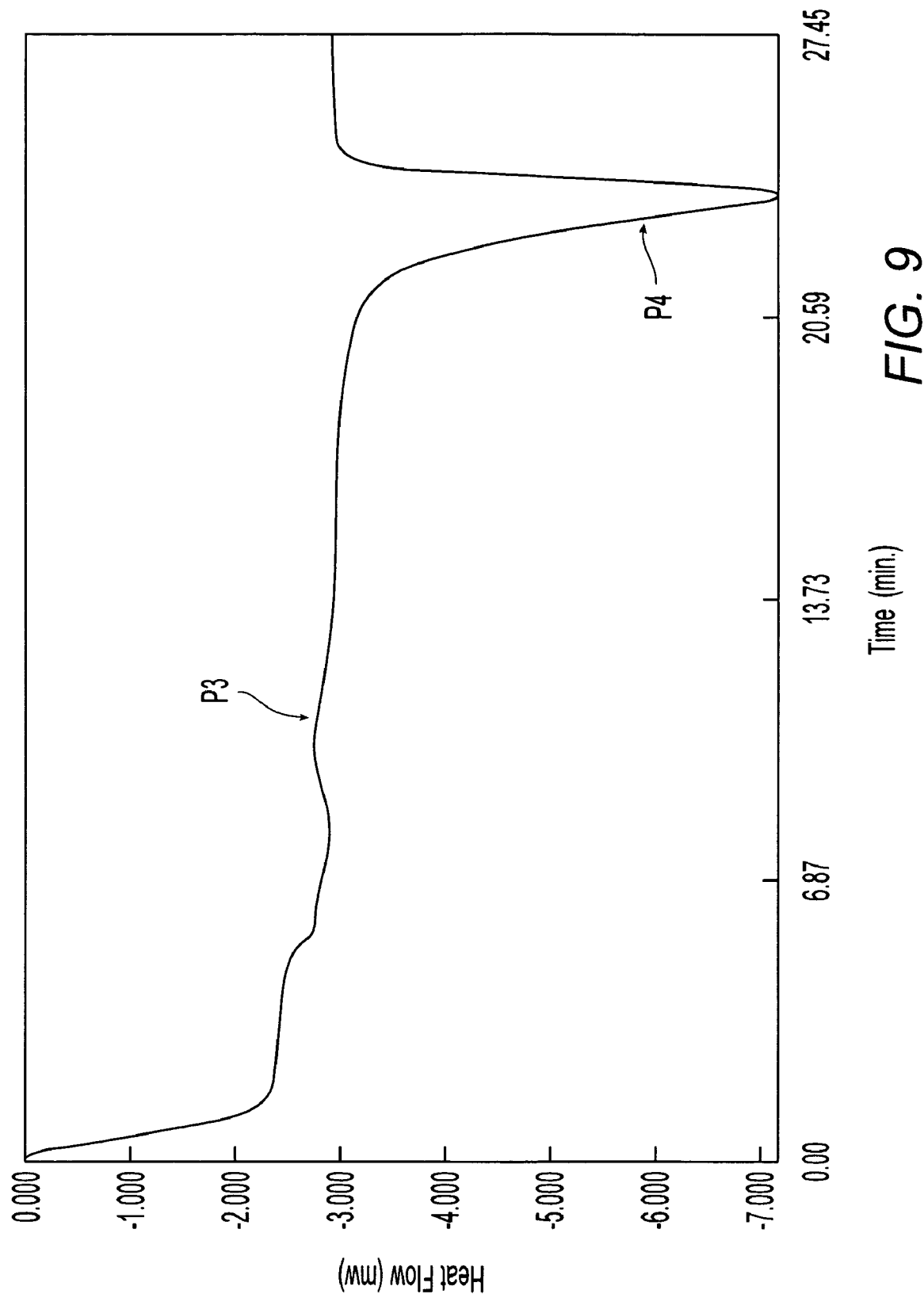
FIG. 9 is a graph of heat flow (milliwatts) as a function of time (minutes) for the middle of a PET coating formed from clear PET flakes.

Referring first to FIGS. 8-9, data for tests A-B, respectively, is presented. As can be seen for example in FIG. 8, data for the outer surface of the PET coating includes a peak P1 that has a maxima corresponding to the polymer's crystallization point while peak P2 has a minima corresponding to the polymer's melting point. As shown in FIG. 9, data for the middle of the PET coating includes a peak P3 that similarly has a maxima corresponding to the polymer's crystallization point while peak P4 has a minima corresponding to the polymer's melting point. Analysis of the data indicates that the middle of the PET coating has substantially greater crystallinity (24.47%) compared to the outer surface of the PET coating (9.55%).

Figure 10:
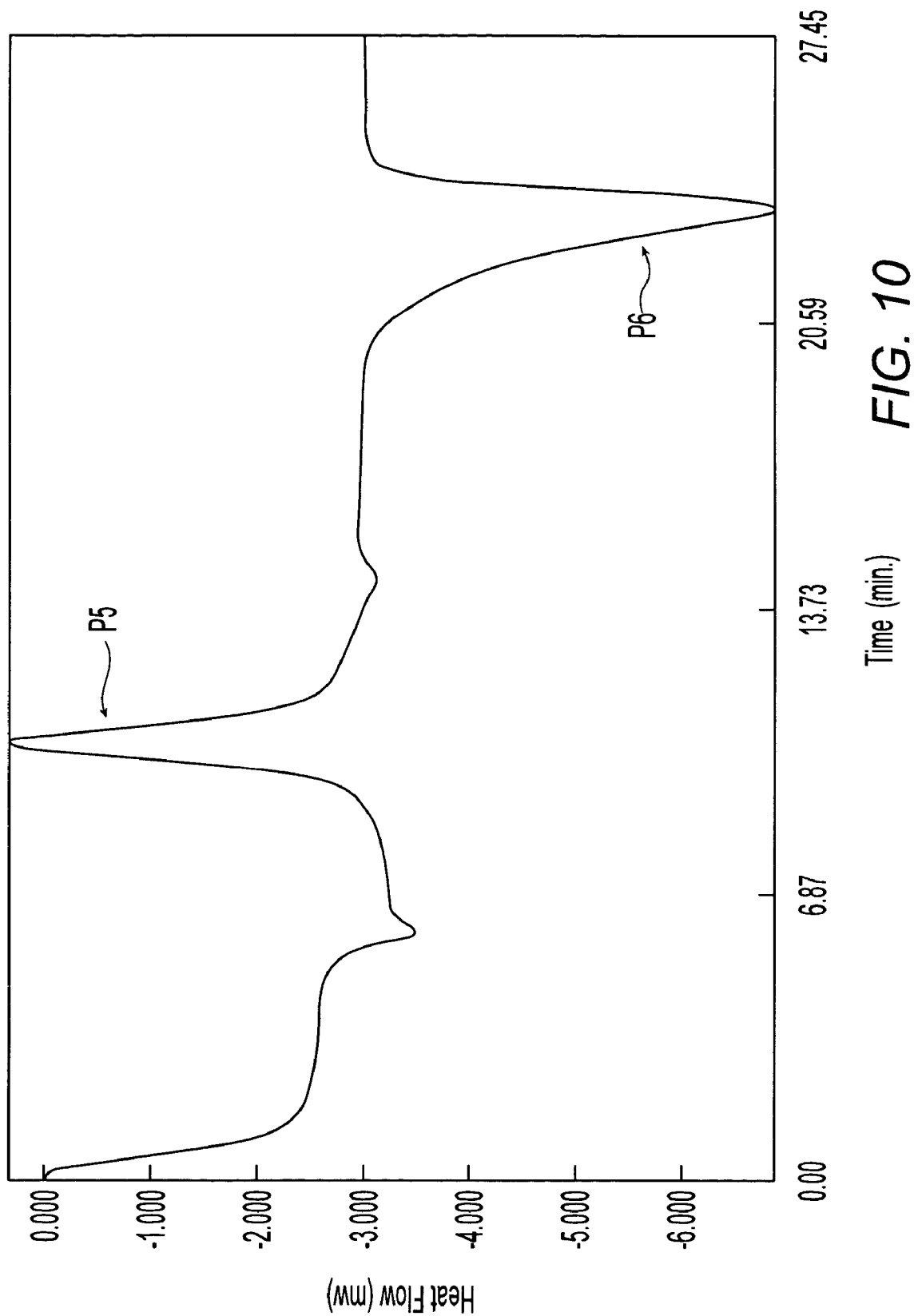
FIG. 10 is a graph of heat flow (milliwatts) as a function of time (minutes) for the outer surface of a PET coating formed from multi-color PET flakes.
Figure 11:
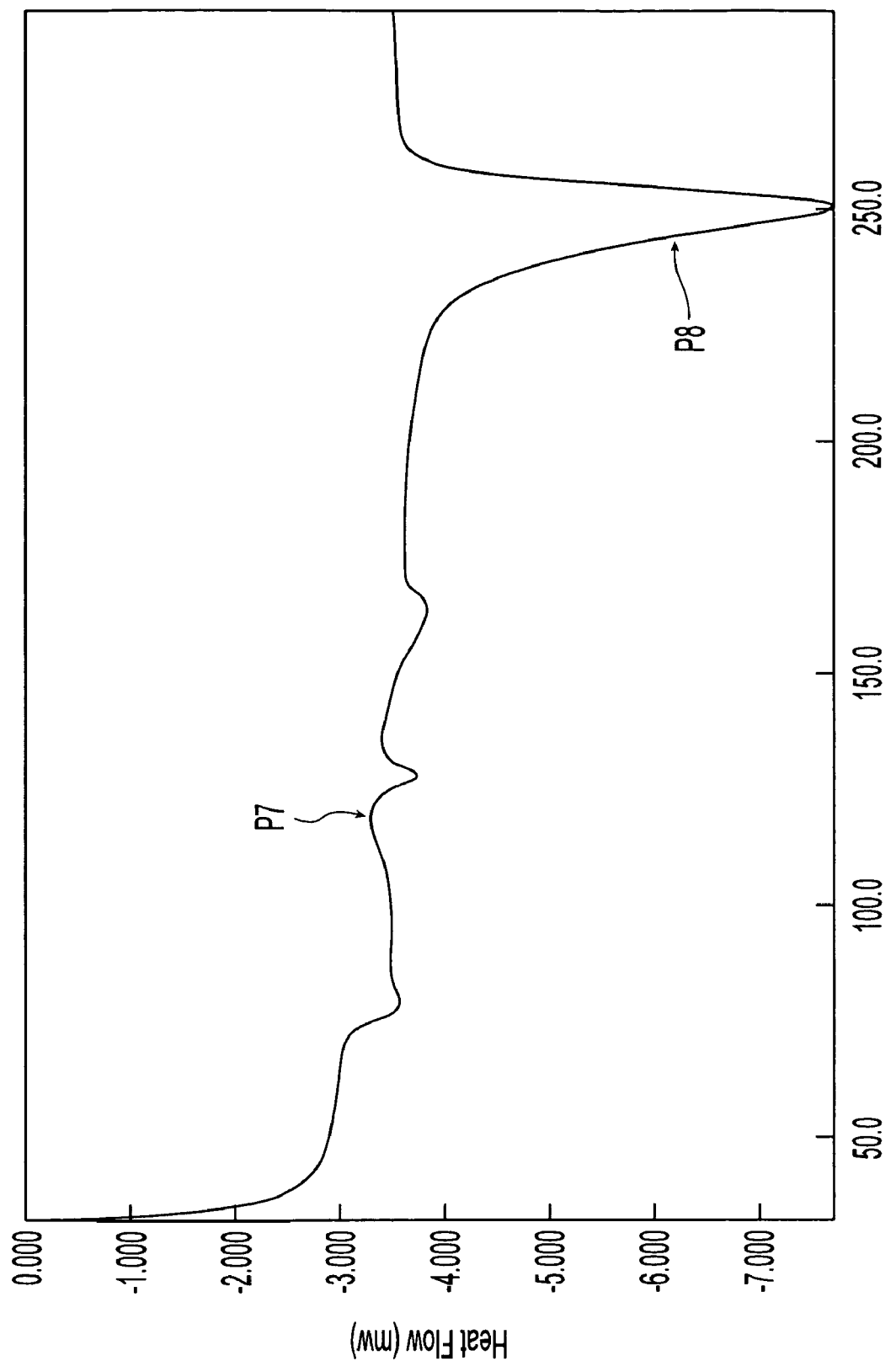
FIG. 11 is a graph of heat flow (milliwatts) as a function of temperature (° C.) for the middle of a PET coating formed from multi-color PET flakes.

Next, referring to FIGS. 10-11, data for tests C-D, respectively, is presented. As can be seen for example in FIG. 10, data for the outer surface of the PET coating includes a peak P5 that has a maxima corresponding to the polymer's crystallization point while peak P6 has a minima corresponding to the polymer's melting point. As shown in FIG. 11, data for the middle of the PET coating includes a peak P7 that similarly has a maxima corresponding to the polymer's crystallization point while peak P8 has a minima corresponding to the polymer's melting point. Analysis of the data indicates that the middle of the PET coating has substantially greater crystallinity (19.67%) compared to the outer surface of the PET coating (8.07%).

Figure 12:
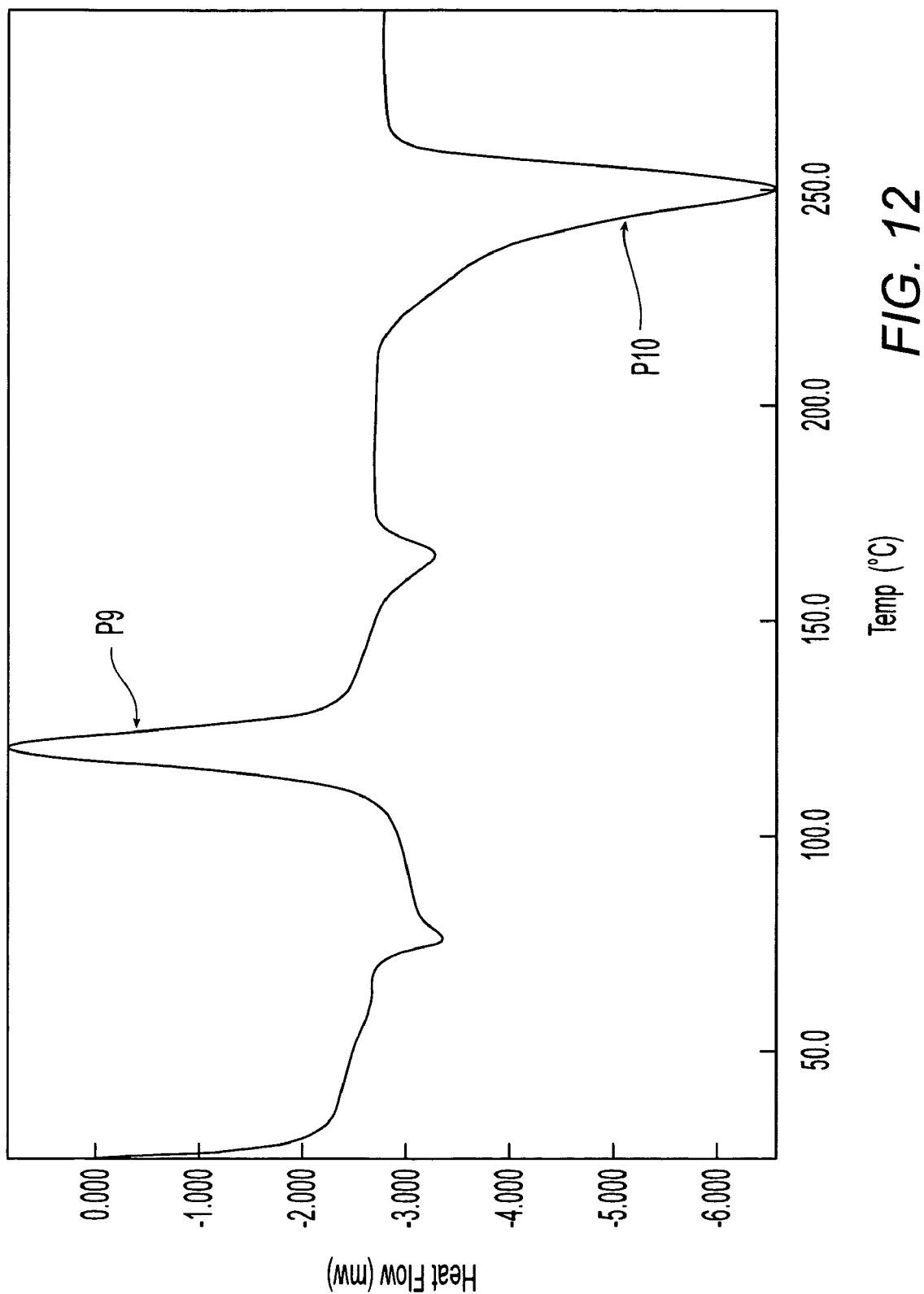
FIG. 12 is a graph of heat flow (milliwatts) as a function of temperature (° C.) for the outer surface of a PET coating formed from amber/brown PET flakes.
Figure 13:
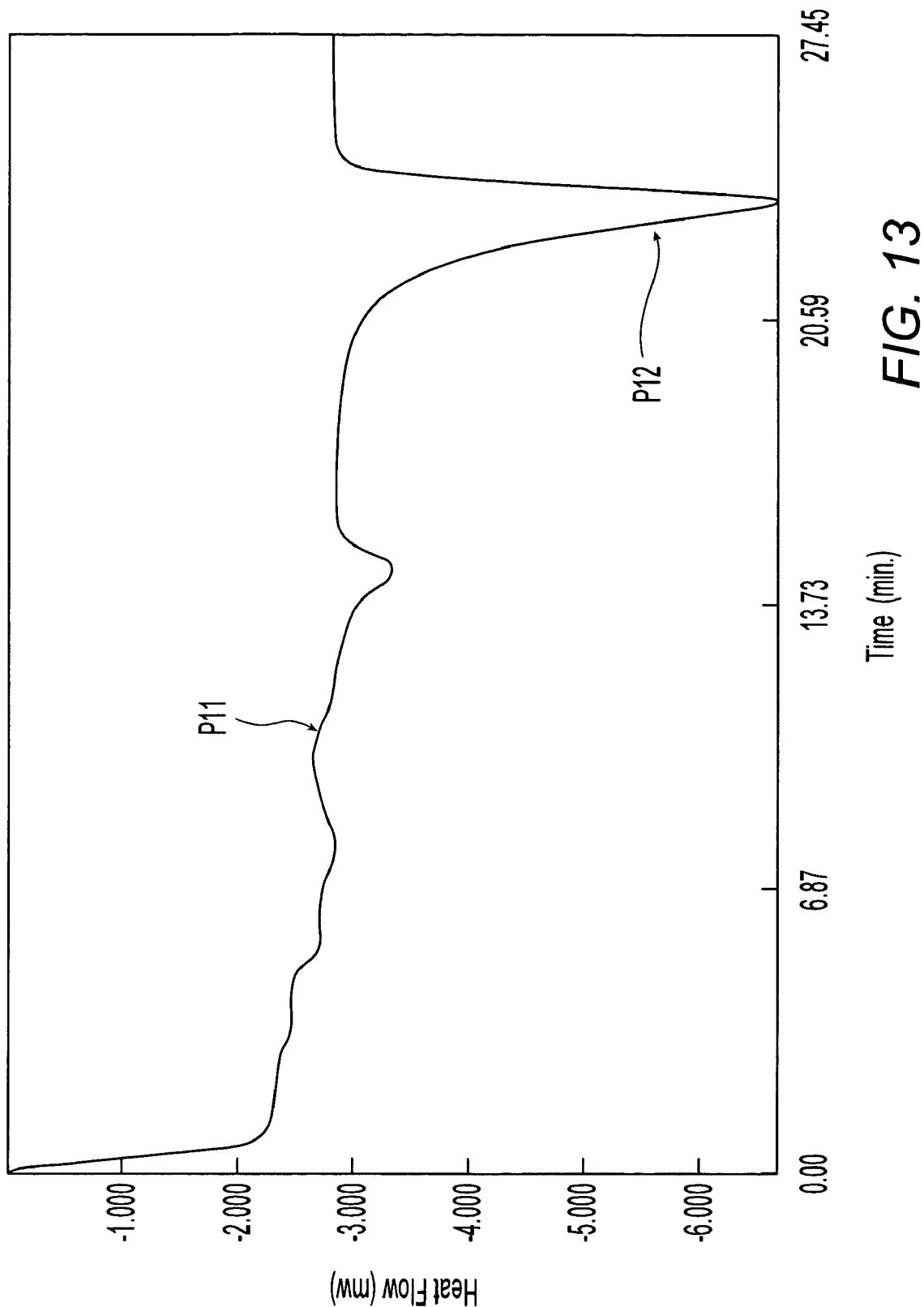
FIG. 13 is a graph of heat flow (milliwatts) as a function of time (minutes) for the middle of a PET coating formed from amber/brown PET flakes.

Finally, referring to FIGS. 12-13, data for tests E-F, respectively, is presented. As can be seen for example in FIG. 12, data for the outer surface of the PET coating includes a peak P9 that has a maxima corresponding to the polymer's crystallization point while peak P10 has a minima corresponding to the polymer's melting point. As shown in FIG. 13, data for the middle of the PET coating includes a peak P11 that similarly has a maxima corresponding to the polymer's crystallization point while peak P12 has a minima corresponding to the polymer's melting point. Analysis of the data indicates that the middle of the PET coating has substantially greater crystallinity (24.05%) compared to the outer surface of the PET coating (9.73%).

Possible sources of error in the data collection include impurities resident in the injection molder and introduced into the PET melt feed stream, as well as inhomogeneous mixing of PET, caps, and label materials in the melts. In addition, several additional peaks discernable in the figures may be the result, for example, of nylon and polyethylene in the coatings.

The polymer used to coat the metal member to form the mine roof support may include first and second polymer phases, with at least one of the phases having a glass transition temperature less than about 20° C., or at least one of the phases having a glass transition temperature less than about 0° C. As is known in the art, "glass transition temperature" in this context is determined by ASTM E 1356, "Standard Test Method for Glass Transition Temperatures by Differential Scanning Calorimetry or Differential Thermal Analysis." This ASTM standard is incorporated herein by reference for the substance of what it discloses.

In coatings of metal members described herein as including at least two different polymers (e.g., an inhomogeneous mixture of two polymers, first and second polymers that are substantially insoluble with respect to each other, or first and second polymer phases), the polymers may be disposed on the metal member in various configurations. In one exemplary configuration, the polymers are disposed adjacent one another. In another exemplary embodiment, the polymers are disposed in layered fashion as in planking. In yet another exemplary embodiment, the polymers are interwoven. The polymers thus may form a fibrous structure, a ribbon structure, and/or an interwoven structure on the metal member. Such structures may be formed as a result of the type of injection molding machinery employed. For example, if a piston-type extruder is used for simultaneously injecting two polymers into a mold, the polymers may form a surface coating on a metal member that appears to be substantially inhomogeneous on both a macro-scale (e.g., to the naked eye) and a micro-scale. On the other hand, if a screw-type extruder is used for simultaneously injecting two polymers into a mold, the surface coating formed by the polymers on a metal member may appear to be substantially homogeneous on a macro-scale but substantially inhomogeneous on a micro-scale. Thus, as used herein, the term "inhomogeneous" refers to one or more of the macro-scale and micro-scale.

Figure 14:
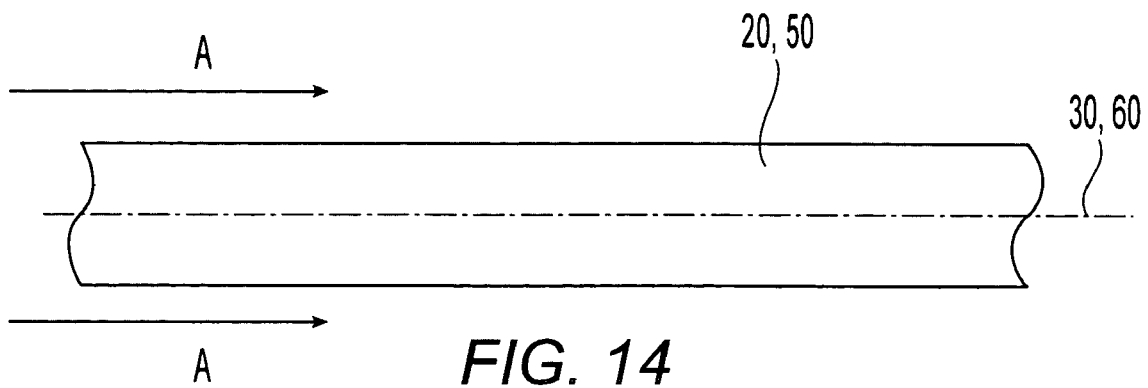
FIG. 14 is a side view of an exemplary method of injecting polymer proximate a first central member in accordance with the present invention.
Figure 15:
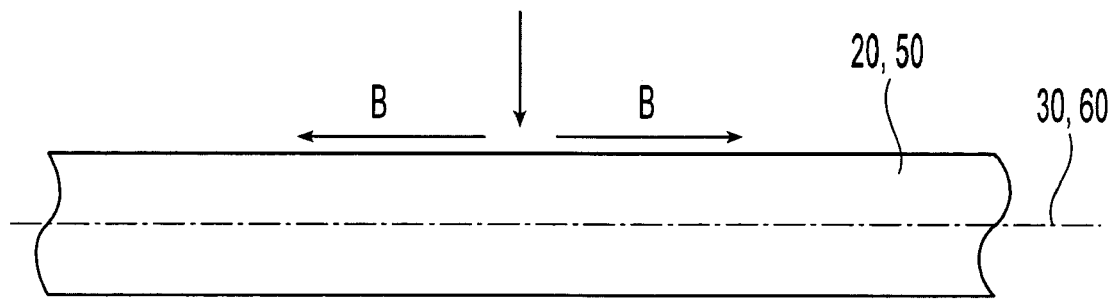
FIG. 15 is a side view of another exemplary method of injecting polymer proximate a first central member in accordance with the present invention.

A variety of molding methods are contemplated in accordance with the present invention. Second perimetral portions 22, 52 of polymer such as PET may be formed in a manner that is directionally oriented. For example, as shown in FIG. 14, polymer may be injected in flows A generally parallel to axis 30, 60 of first central portion 20, 50. Such flows A may originate proximate an end of the bolt. Alternatively, as shown in FIG. 15, polymer initially may be injected in a direction substantially transverse to axis 30, 60 and then spread in flows B generally parallel to axis 30, 60. Because the polymer flows are in the longitudinal direction along the first central portion 20, 50, the polymer may be oriented in the longitudinal direction to provide strength and/or toughness in that direction.

In another method of molding according to the present invention, a first central portion 20, 50 may be gradually translated out of a mold cavity while injection of polymer occurs, thus producing an oriented polymer coating thereon.

In some methods of molding according to the present invention, polymer melts are injected under high pressure into mold cavities to form the second perimetral portions 22, 52. In particular, the recycled polymer contemplated for use in the present invention is typically available as shred material in the form of flakes. When the flakes are melted for injection, air may be trapped which can introduce bubbles in the polymer melt. By injecting the polymer under high fluid pressure into a mold, e.g. a fluid pressure of at least about 10,000 psi, bubble sizes may be reduced so that a more dense coating can be produced without large voids. In addition, by using sufficient molding pressure, improved polymer flow may be achieved such that trapping of air proximate texturing on the first central portion 20, 50 (which may for example be formed of rebar or the like) may be avoided.

In yet another method of molding according to the present invention, a mold having a mold cavity of a first length may be used to coat a first central portion 20, 50 having a second length greater than the first length. For example, a mold cavity that extends over a length of about 2.75 feet may be used to coat a first central portion 20, 50 having a total length of about 6 feet. In particular, part of first central portion 20, 50 including an end thereof initially may be disposed in the mold cavity and polymer may be injected therein to form a coating for a second perimetral portion 22, 52. Next, another part of first central portion 20, 50 including a section proximate the other end thereof may be disposed in the mold cavity and polymer may be injected therein to form a further coating for a second perimetral portion 22, 52. If a non-uniform thickness in the form of a discontinuous coating over the longitudinal length of the mine bolt is desired, for example to provide a bend point as previously described, the region of the first central portion 20, 50 to be left uncoated may remain outside the mold cavity during both steps. Alternatively, that region may be temporarily covered to interrupt the flow of polymer and prevent a coating from forming in that region.

Figure 16:
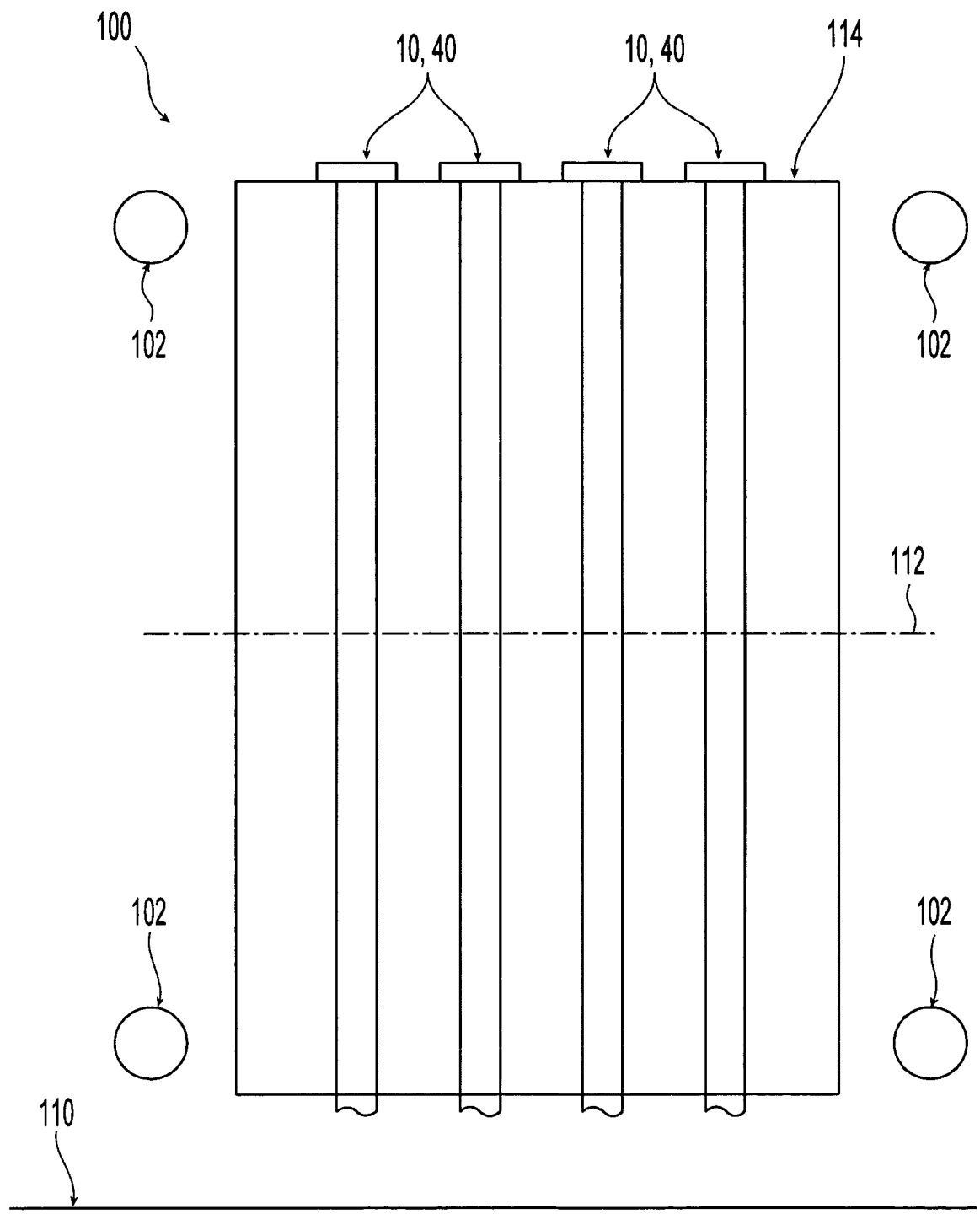
FIG. 16 is a schematic of an exemplary mine bolt molding method using vertical loading in accordance with the present invention.

Turning to FIG. 16, the use of multi-cavity molds may permit two or more bolts to be created simultaneously during injection molding. In the exemplary embodiment, four bolts 10, 40 are molded simultaneously in separate mold cavities. In one preferred embodiment, eight bolts are coated with polymer simultaneously in the same mold formed with eight cavities.

In particular, first central portions 20, 50 are positioned in cavities in mold 100 (shown schematically) which may be formed between a pair of cooperating mold portions movable along tie bars 102 (which extend into the printed page). The bolts 10, 40 each are provided with an injection molded second perimetral portion 22, 52 while bolts 10, 40 are disposed generally vertically above ground 110. Because typical mold arrangements 100 operate with tie bars 102, the bolts 10, 40 in some mold arrangements 100 cannot readily be translated into or out of mold 100 while the bolts 10, 40 for example are oriented perpendicular to axis 112 (which is generally parallel to ground 110). Tie bars 102 interfere with such movement. Thus, it may be necessary to load and unload bolts 10, 40 from above top 114 of mold 100 and thus translate the bolts 10, 40 in a direction generally perpendicular to ground 110 so that tie bars 102 do not interfere with bolt movement. Also, because mold 100 typically is not high off ground 110, there is insufficient room for bolts 10, 40 to drop out of an open mold 100 onto a conveyor for example running proximate ground 110.

Figure 17:
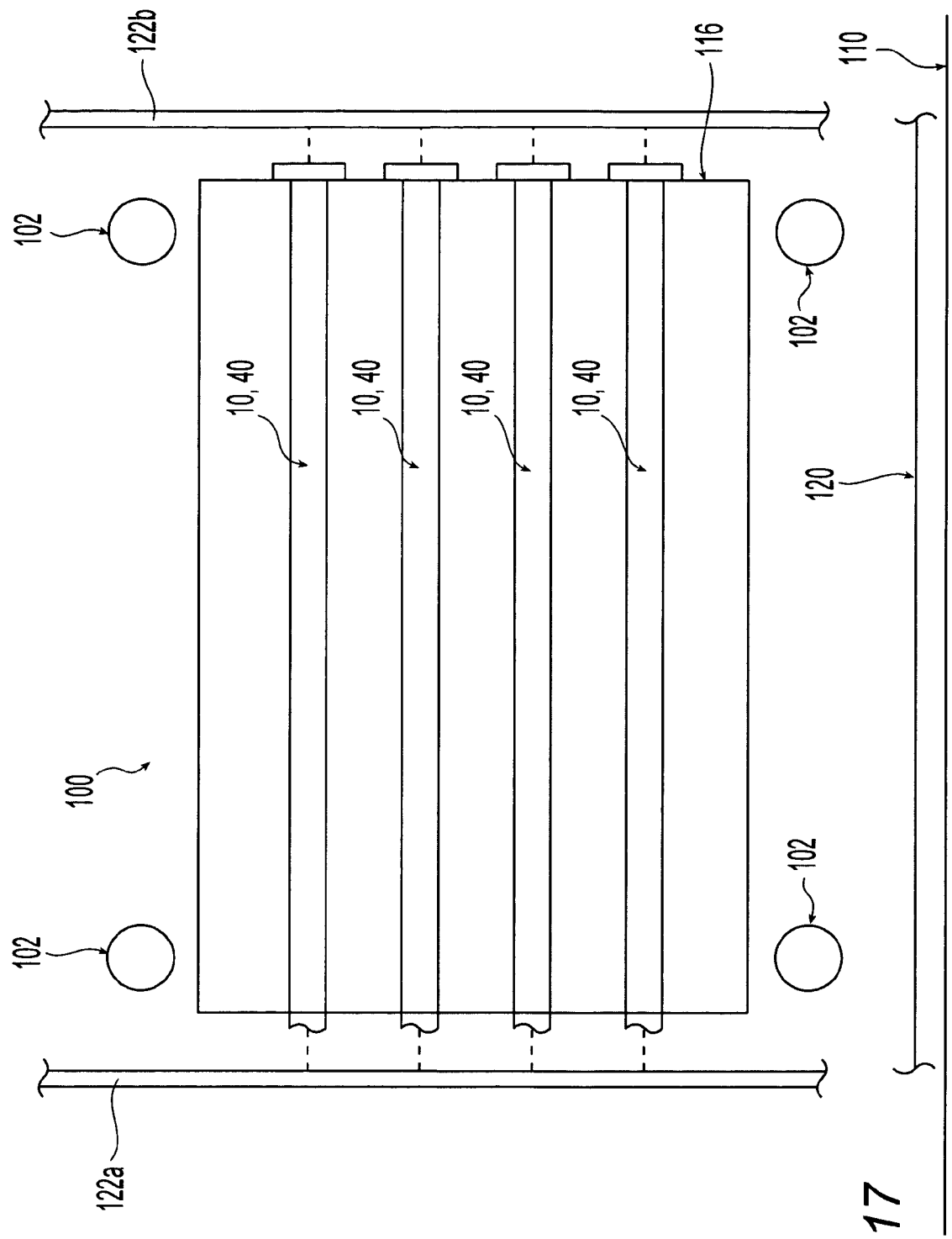
FIG. 17 is a schematic of an exemplary mine bolt molding method using horizontal loading in accordance with the present invention.

Turning next to FIG. 17 there is shown another exemplary embodiment in which four bolts 10, 40 are molded simultaneously in separate mold cavities. In a preferred embodiment, eight bolts are coated with polymer simultaneously in the same mold formed with eight cavities. As described previously, first central portions 20, 50 are positioned in cavities in mold 100 (shown schematically) which may be formed between a pair of cooperating mold portions movable along tie bars 102 (which extend into the printed page). The bolts 10, 40 each are provided with an injection molded second perimetral portion 22, 52 while bolts 10, 40 are disposed generally horizontally above ground 110. Even with tie bars 102, the bolts 10, 40 readily may be translated into or out of mold 100 while the bolts 10, 40 for example are oriented generally parallel to ground 110. Tie bars 102 do not interfere with such movement. Thus, bolts 10, 40 are loaded and unloaded from side 116 of mold 100 and thus bolts 10, 40 are translated in a direction generally parallel to ground 110. Also, because mold 100 typically is not high off ground 110, there is insufficient room for bolts 10, 40 to drop out of an open mold 100 onto a conveyor for example running proximate ground 110. After molding of bolts 10, 40, they may be released from within the cooperating mold portions and permitted to drop onto a conveyor or tray for example disposed below mold 100 but above the tie bars 102 closest to ground 110 for transport away from the molding operation.

During the molding operation, movement of bolts 10, 40 may be automated and governed by "grippers" as known in the art, such as by gripping one or both of ends 12, 42 and 14, 44, respectively. Automation also may be facilitated by having gripping regions (such as ends 12, 42 and 14, 44) that extend outside of mold 100 during the molding process. For example, as shown schematically in FIG. 17, bolts 10, 40 optionally may be moved via one or more linked conveyors 122a, 122b, so that the bolts may be moved in registered or indexed manner with four new bolts being automatically positioned in mold 100 by the conveyors 122a, 122b during each molding cycle. Bolts could additionally be secured in mold 100 using magnets which attract first central portion 20, 50.

In the preferred embodiment, mold 100 comprises a fixed platen and a movable platen that cooperate with one another to form one ore more molding cavities. The movable platen translates on tie bars 102.

Figure 18A:
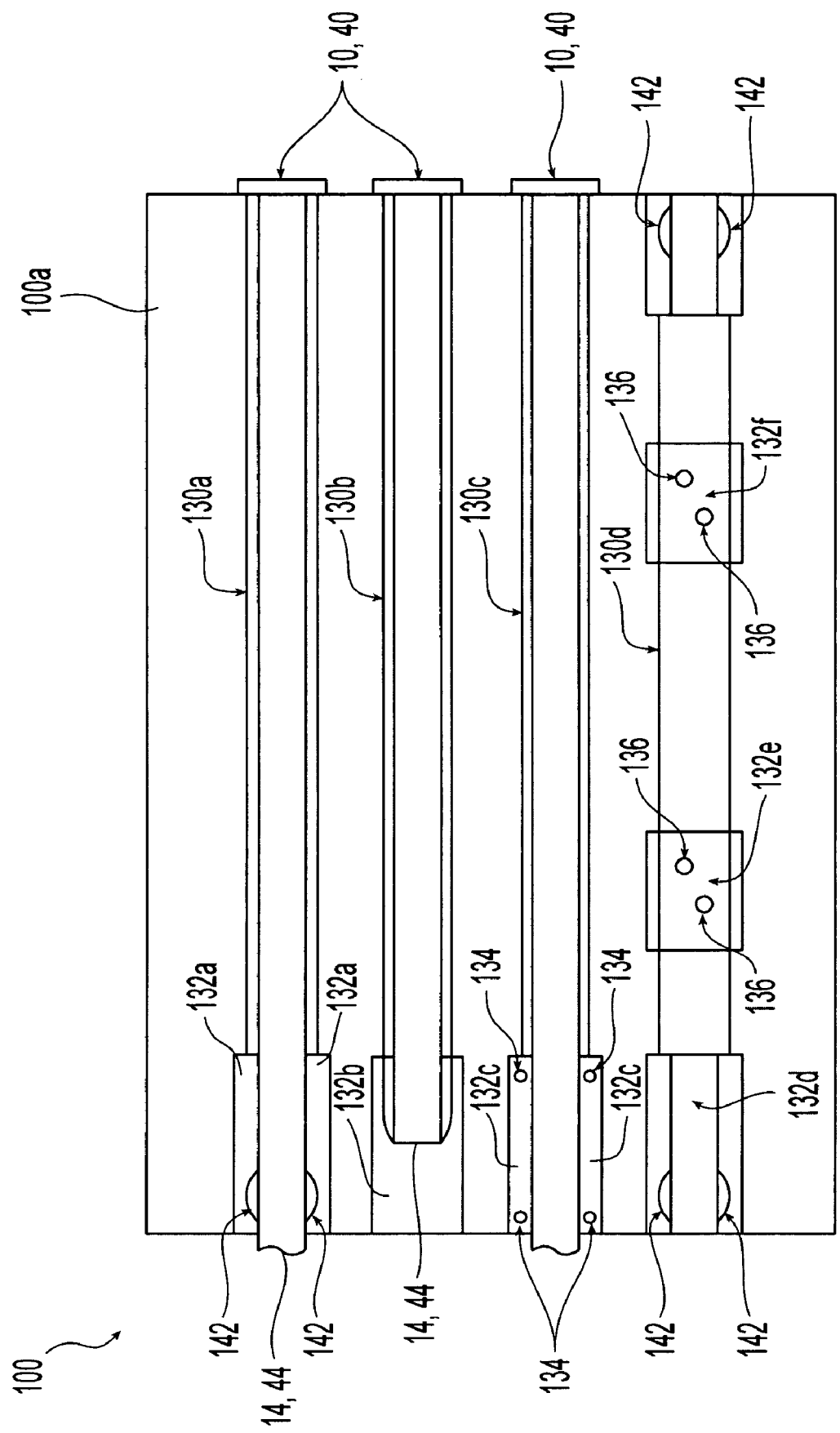
FIG. 18A is a side view of a mold platen for use in accordance with the present invention.

With reference to FIG. 18A, preferred constructions of mold 100 will be described. As shown in the figure, platen 100a includes cavities 130a, 130b, 130c, 130d for receiving bolts 10, 40. In order to adjust the length of the cavities for applying a second perimetral portion 22, 52 to a bolt 10, 40, respectively, and in order to permit indicia or other contouring to be changed as required for a given customer or bolt design, inserts may be demountably coupled to platen 100a to form portions of cavities 130a, 130b, 130c, 130d. In particular, as shown for example with respect to cavity 130a, an insert 132a is disposed proximate an end 14, 44 of bolt 10, 40 opposite the head thereof and prevents the flow of polymer proximate end 14, 44. Thus, an uncoated region of bolt 10, 40 optionally may be produced during the molding. On the other hand, an insert 132b is provided for cavity 130b for accommodating bolt lengths that are shorter than the overall length of platen 100a. In addition, insert 132b is configured and dimensioned to provide a tapered coating proximate end 14, 44 of bolt 10, 40 as shown. Inserts may be bolted to platen 100a as shown with respect to insert 132c and corner bolts 134. And, as shown with respect to cavity 134d (shown without a bolt 10, 40 disposed therein), any number of inserts such as inserts 132d, 132e, 132f may be provided along the length of cavity 134d to achieve particular features such as texturing, indicia, or contouring on a given portion of second perimetral portion 22, 52. Thus, portions of cavities 130a, 130b, 130c, 130d without inserts preferably are permanently cut into platen 100a, while the inserts may be demountably attached to the platen to form the remaining portions of the cavities or to limit the size of the cavities. In an alternate embodiment, the entire length of one or more of cavities 130a, 130b, 130c, 130d in platen 100a may be formed to accommodate inserts so that the cavity length may be readily changed for injection molding with different lengths of bolts. In order to ensure that a first central portion 20, 50 of a respective bolt 10, 40 may be generally centered within a mold cavity defined by a pair of platens, pins 136 may extend within the cavity thus spacing first central portion 20, 50 from the cavity walls.

Figure 18B:
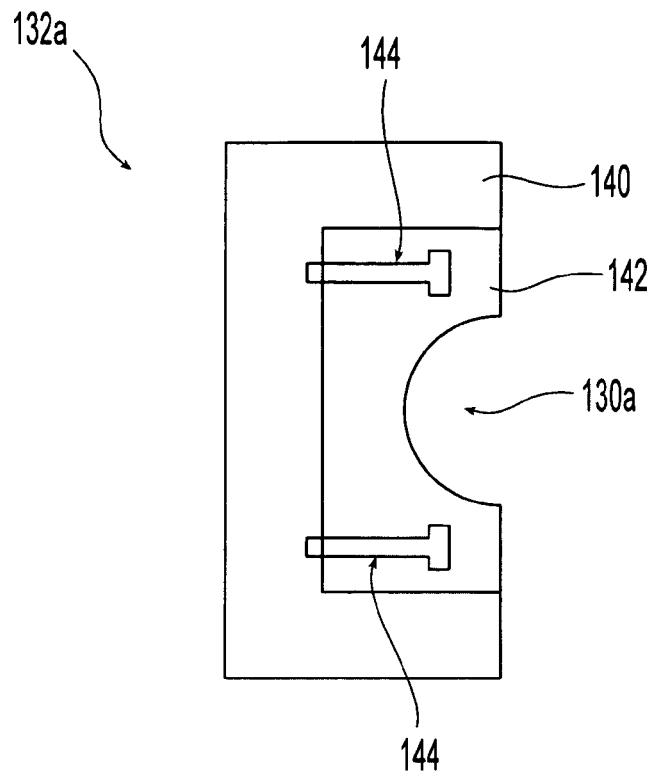
FIG. 18B is an insert for use with the mold platen of FIG. 18A.

As shown in FIG. 18B, an exemplary insert such as insert 132a preferably is formed with an outer casing 140 and optionally an inner section 142 that for example may form a portion of cavity 130a. Inner section 142 may be formed of a pourable liquid polymer that sets in place such as 94A Liquid Urethane (including a base and liquid activator/hardener) available from Forsch Polymer Corp. (Denver, Colo.). The polyurethane inner section 142 is used in order to provide a more positive seal to prevent flow of the injected polymer, and also serves to seal an irregular surface of a bolt 10, 40 in the mold. In particular, rebar typically is supplied with a relatively loose tolerance, and thus the mold cavities used to form coated bolts according to the present invention preferably are sized to accommodate bolts within the tolerance. Inner section 142 thus may be formed to provide a portion of the mold cavity with a diameter that is approximately the same as or slightly smaller than the smallest diameter of rebar. As shown in FIG. 18A, inner sections 142 preferably may be provided in regions of molds proximate the locations where portions of first central member 20, 50 protrude outside the mold. Screws 144 may be coupled to outer casing 140 prior to pouring of polyurethane inner section 142, so that once inner section 142 has set there is further resistance to pullout of section 142 from section 140. Such a polyurethane composition has resistance to thermal degradation over many cycles. However, in the event of undesirable degradation, the insert simply may be placed in an oven to bake-out the polyurethane for easy removal. New polyurethane may subsequently be allowed to set in outer casing 142.

Figure 18C:
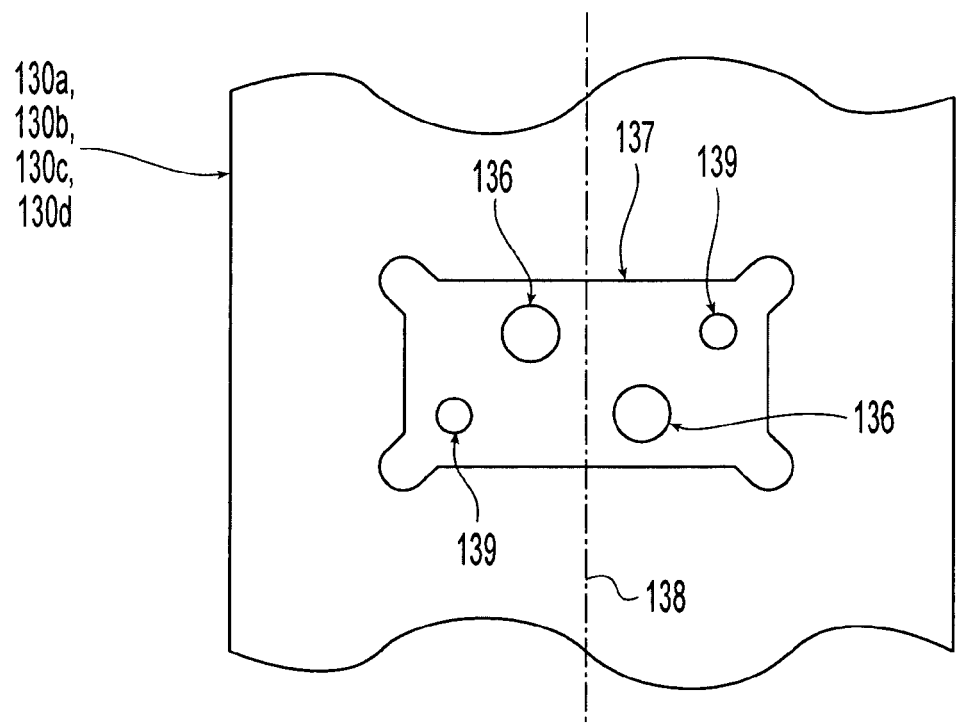
FIG. 18C shows the positioning of pins in an insert for use with a mold platen of FIG. 18A.

As shown in FIG. 18C, pins 136 may protrude from an insert 137, and preferably are oriented along a line transverse to the longitudinal axis 138 of a cavity 130a, 130b, 130c, 130d. Insert 137 may be generally of a dogbone configuration as shown. Preferably, two inserts 137 each having two pins 136 are provided in each cavity 130a, 130b, 130c, 130d in each mold platen in order to space bolts from the mold surfaces. Pins 136 may be threadably associated with insert 137 so their extension into the cavity may be selectively adjusted. In one embodiment, the pins may protrude about ⅛ inch with respect to the mold surfaces. A pair of set screws 139 may be used to retain insert 137 on the platen.

In another aspect of the present invention, injection molding using melts of flakes of post-consumer PET derived from soft drink bottles has been experimentally demonstrated to produce a very brittle PET material particularly when the injection molded PET lacks orientation and/or is crystalline. Such material, at a thickness of about 6 mm, has been shown to be easily breakable by hand.

The addition of Portland-like cements (or similar chemical compositions) to PET in the range of about 1 wt % to about 50 wt % advantageously may results in materials with enhanced mechanical behavior.

The chemical composition of Portland cements is generally presented below in Table II:

TABLE II

| Component | Mass Contents(%) |
| --- | --- |
| CaO | 58-66 |
| SiO$_2$ | 18-26 |
| Al$_2$O$_3$ | 4-12 |
| Fe$_2$O$_3$ + FeO | 1-6 |
| MgO | 1-3 |
| SO$_3$ | 0.5-2.5 |
| K$_2$O and NaO$_2$ | <1 |

See, e.g., Brandt, A. M., *Cement-Based Composites: Materials, Mechanical Properties and Performance*. E & F Spon, 1995.

Experimentally, the addition of about 5 wt % to about 15 wt % Portland cement to recycled PET has been found to greatly enhance the toughness and modulus of the polymer. Filler material in the form of particulate Portland cement has been added to melts of flakes of post-consumer PET derived from soft drink bottles. The Portland cement had an average particle size of less than about 100 µm to facilitate uniform distribution, especially at higher cement levels.

Specifically, when about 5 wt % to about 15 wt % Portland type II cement was added to the recycled PET flakes and melts of the PET/cement material were injection molded, the final material was found to be noticeably tougher and more resilient to impact. It was generally shown that the greater the percentage of cement, the greater the realized toughness. At no more than about 15 wt %, most of the cement stuck to the surface of the PET flakes resulting in a fairly homogenous melt and injection molded material. However, it was shown to be difficult to add more than about 15 wt % cement to the PET flakes because the cement appeared to separate from the flakes resulting in a non-homogenous melt and injection molded material.

Also, during the experimentation, no steam or condensate was observed on the mold or escaping from the ram cylinder when cement was added. From this observation, it is believed that the cement acts as a getter, absorbing much of the water that is on the PET flakes.

Additional laboratory-scale experimentation has demonstrated similar toughness increases as a result of the addition of about 5 wt % to about 0.10 wt % Portland type I cement to recycled PET flakes. Again, the Portland cement had an average particle size of no more than about 100 µm. From melts of such combinations, much tougher and less brittle solid materials were produced.

The reason that Portland cement toughens PET is not well understood. Three explanations for the observed toughening are proposed. First, the cement may toughen the polymer by inhibiting crack propagation. Second, the cement may act as a getter for water which is known to greatly reduce PET chain length. Third, the alkali metal in the cement may act as a weak cross-linking agent forming larger chain lengths and thus resulting in greater toughness.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. For example, the metal members described herein instead may be formed of other materials such as polymers or reinforced polymers. Thus, each of the mining bolt constructions described herein as using a metal member instead may use a member alternatively formed of a material other than metal. Also, texturing such as texturing 24, 54 may be provided on each of the mining bolt constructions described herein. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. An anchorable mine support for anchoring in a borehole with resin or grout, comprising:
   an elongate metal member; and
   a coating comprising post-consumer recycled poly(ethylene terephthalate) disposed on the member, the post-consumer recycled poly(ethylene terephthalate) having a portion with a thickness of at least about 1 mm.

2. The mine support of claim 1, wherein the coating is an injection molded coating.

3. The mine support of claim 1, wherein the coating further comprises a second polymer that is substantially insoluble with respect to the post-consumer recycled poly(ethylene terephthalate).

4. The mine support of claim 3, wherein the second polymer comprises a polymer with a glass transition temperature less than about 20° C.

5. The mine support of claim 3, wherein the second polymer comprises a polymer with a glass transition temperature less than about 0° C.

6. The mine support of claim 3, wherein the second polymer comprises a polyolefin.

7. The mine support of claim 6, wherein the polyolefin comprises polyethylene.

8. The mine support of claim 7, wherein the coating comprises at least 80% poly(ethylene terephthalate) by weight of polymer therein.

9. The mine support of claim 6, wherein the polyolefin comprises polypropylene.

10. The mine support of claim 9, wherein the coating comprises at least 80% poly(ethylene terephthalate) by weight.

11. The mine support of claim 1, wherein the post-consumer recycled poly(ethylene terephthalate) has an intrinsic viscosity at least about 0.35 dL/g and no greater than about 0.75 dL/g.

12. The anchorable mine support of claim 1, wherein the coating has a specific gravity lower than that of resin grout for retaining the mine support in a borehole.

13. The anchorable mine support of claim 12, wherein the resin is medium speed resin grout.

14. A mine support comprising:
   an elongate metal member; and
   a coating comprising post-consumer recycled poly(ethylene terephthalate) disposed on the member;
   wherein the coating comprises a first layer with a thickness at least about 0.1 mm and a crystallinity between about 16% and about 30%.

15. The mine support of claim 14, wherein the coating further comprises a second layer with a thickness at least about 0.1 mm and a crystallinity between about 6% and about 14%.

16. The mine support of claim 15, wherein the second layer contacts the elongate metal member.

17. The mine support of claim 15, wherein the first layer contacts the elongate metal member.

18. The mine support of claim 17, wherein the thickness of the first layer is at least about 1.0 mm.

19. The mine support of claim 17, wherein the thickness of the second layer is at least about 0.2 mm.

20. The mine support of claim 15, wherein the coating further comprises a third layer with a thickness at least about 0.1 mm and a crystallinity between about 6% and about 14%, and wherein the first layer is disposed between the second and third layers.

21. The mine support of claim 15, wherein the thickness of the second layer is at least about 0.2 mm.

22. A mine support comprising:
an elongate metal member; and
a coating comprising post-consumer recycled poly(ethylene terephthalate) disposed on the member;
wherein the coating comprises a first layer with a thickness at least about 0.1 mm and a crystallinity between about 16% and about 28%.

23. The mine support of claim 22, wherein the coating further comprises a second layer with a thickness at least about 0.1 mm and a crystallinity between about 8% and about 12%.

24. The mine support of claim 23, wherein the second layer contacts the elongate metal member.

25. The mine support of claim 23, wherein the first layer contacts the elongate metal member.

26. The mine support of claim 25, wherein the thickness of the first layer is at least about 1.0 mm.

27. The mine support of claim 25, wherein the thickness of the second layer is at least about 0.2 mm.

28. The mine support of claim 23, wherein the coating further comprises a third layer with a thickness at least about 0.1 mm and a crystallinity between about 8% and about 12%, and wherein the first layer is disposed between the second and third layers.

29. The mine support of claim 23, wherein the thickness of the second layer is at least about 0.2 mm.

30. A mine support comprising:
an elongate metal member; and
a coating comprising post-consumer recycled poly(ethylene terephthalate) disposed on the member;
wherein the coating comprises a first layer with a thickness at least about 0.1 mm and a crystallinity between about 16% and about 26%.

31. The mine support of claim 30, wherein the coating further comprises a second layer with a thickness at least about 0.1 mm and a crystallinity between about 8% and about 12%.

32. The mine support of claim 31, wherein the second layer contacts the elongate metal member.

33. The mine support of claim 31, wherein the first layer contacts the elongate metal member.

34. The mine support of claim 33, wherein the thickness of the first layer is at least about 1.0 mm.

35. The mine support of claim 33, wherein the thickness of the second layer is at least about 0.2 mm.

36. The mine support of claim 31, wherein the coating further comprises a third layer with a thickness at least about 0.1 mm and a crystallinity between about 8% and about 12%, and wherein the first layer is disposed between the second and third layers.

37. The mine support of claim 31, wherein the thickness of the second layer is at least about 0.2 mm.

38. An anchorable mine support for anchoring in a borehole with resin or grout, comprising:
an elongate metal member; and
a coating comprising post-consumer recycled thermoplastic disposed on the member, the post-consumer recycled thermoplastic having a portion with a thickness of at least about 1 mm and forming a textured outer surface on the metal member.

39. The mine support of claim 38, wherein the thermoplastic comprises post-consumer recycled poly(ethylene terephthalate).

40. The mine support of claim 39, wherein the coating is an injection molded coating.

41. The mine support of claim 38, wherein the thermoplastic comprises post-consumer recycled polycarbonate.

42. The mine support of claim 41, wherein the coating further comprises about 1% or less of metal by weight of polymer therein.

43. The mine support of claim 42, wherein the metal comprises aluminum.

44. The mine support of claim 43, wherein the thermoplastic further comprises a second polymer with a glass transition temperature less than about 20° C.

45. The mine support of claim 41, wherein the thermoplastic further comprises a second polymer with a glass transition temperature less than about 0° C.

46. The mine support of claim 41, wherein the thermoplastic further comprises a second polymer that comprises a polyolefin.

47. The mine support of claim 46, wherein the polyolefin comprises polyethylene.

48. The mine support of claim 47, wherein the coating comprises at least 80% polycarbonate by weight of polymer therein.

49. The mine support of claim 46, wherein the polyolefin comprises polypropylene.

50. The mine support of claim 49, wherein the coating comprises at least 80% polycarbonate by weight of polymer therein.

51. The mine support of claim 38, wherein the coating comprises a first layer with a thickness at least about 0.1 mm and a crystallinity between about 16% and about 30%.

52. The mine support of claim 38, wherein the textured outer surface comprises discontinuous threading.

53. The mine support of claim 38, wherein the coating tapers between first and second ends of the metal member.

54. The mine support of claim 38, wherein:
the metal member further comprises a free end and a head end; and
the coating is configured and dimensioned with a taper such that the coating has a greater thickness proximate the free end than proximate the head end.

55. The mine support of claim 38, wherein the coating is configured and dimensioned as a wedge.

56. The mine support of claim 38, wherein the coating extends substantially between ends of the elongate metal member.

57. The mine support of claim 38, wherein the coating encapsulates a free end of the elongate metal member.

58. The mine support of claim 38, wherein:
the coating further comprises filler incorporated in the post-consumer recycled thermoplastic; and
the filler is selected from the group consisting of silicon dioxide, limestone, cement, and fly ash.

59. An anchorable mine roof support for anchoring in a borehole with resin or grout, comprising:
an elongate metal member; and
a coating disposed on the member, the coating comprising an inhomogeneous mixture of post-consumer recycled first and second polymer phases;
wherein the first polymer phase is selected from the group consisting of poly(ethylene tereplithalate), polycarbonate, and polyethylene naphthalate;
wherein the first polymer phase has a portion with a thickness of at least about 1 mm; and
wherein the coating forms a textured outer surface on the metal member.

60. The mine roof support of claim 59, wherein the first polymer phase comprises poly(ethylene terephthalate).

61. The mine roof support of claim 60, wherein the second polymer phase comprises a polymer with a glass transition temperature less than about 20° C.

62. The mine roof support of claim 60, wherein the second polymer phase comprises a polymer with a glass transition temperature less than about 0° C.

63. The mine roof support of claim 60, wherein the second polymer phase comprises a polyolefin.

64. The mine roof support of claim 63, wherein the polyolefin comprises polyethylene.

65. The mine roof support of claim 64, wherein the coating comprises at least 80% poly(ethylene terephthalate) by weight of polymer therein.

66. The mine roof support of claim 63, wherein the polyolefin comprises polypropylene.

67. The mine roof support of claim 66, wherein the coating comprises at least 80% poly(ethylene terephthalate) by weight of polymer therein.

68. The mine roof support of claim 59, wherein the first polymer phase comprises polycarbonate.

69. The mine roof support of claim 68, wherein the second polymer phase comprises polymethylmethacrylate.

70. The mine roof support of claim 69, wherein the coating further comprises metal, wherein the metal is provided in an amount about 1% or less of metal by weight of polymer therein.

71. The mine roof support of claim 70, wherein the metal comprises aluminum.

72. The mine roof support of claim 68, wherein the second polymer phase comprises a polymer with a glass transition temperature less than about 20° C.

73. The mine roof support of claim 68, wherein the second polymer phase comprises a polymer with a glass transition temperature less than about 0° C.

74. The mine roof support of claim 68, wherein the second polymer phase comprises a polyolefin.

75. The mine roof support of claim 74, wherein the polyolefin comprises polyethylene.

76. The mine roof support of claim 75, wherein the coating comprises at least 80% polycarbonate by weight of polymer therein.

77. The mine roof support of claim 74, wherein the polyolefin comprises polypropylene.

78. The mine roof support of claim 77, wherein the coating comprises at least 80% polycarbonate by weight of polymer therein.

79. The mine roof support of claim 59, wherein the first polymer phase comprises polyethylene naphthalate.

80. An anchorable mine roof support for anchoring in a borehole with resin or grout, comprising:
an elongate metal member; and
a coating disposed on the member and comprising a first polymer;
wherein the first polymer has an intrinsic viscosity at least about 0.35 dL/g and no greater than about 0.75 dL/g; and
wherein the first polymer comprises poly(ethylene terephthalate) that forms a first layer with a thickness at least about 1 mm.

81. The mine roof support of claim 80, wherein the coating further comprises a second polymer, and wherein the coating comprises at least 80% poly(ethylene terephthalate) by weight of polymer therein.

82. The mine roof support of claim 80, wherein the coating further comprises a second polymer, and wherein the first and second polymers are insoluble with respect to each other.

83. The mine roof support of claim 82, wherein the first and second polymers form a fibrous structure on the member.

84. The mine roof support of claim 82, wherein the first and second polymers form a ribbon structure on the member.

85. The mine roof support of claim 82, wherein the first and second polymers form an interwoven structure on the member.

86. An anchorable mine support for anchoring in a borehole with resin or grout, comprising:
an elongate metal member; and
a coating comprising post-consumer recycled thermoplastic disposed on the member, the post-consumer recycled thermoplastic having a portion with a thickness of at least about 1 mm and forming a textured outer surface on the metal member;
wherein the coating comprises a first layer with a thickness at least about 0.1 mm and a crystallinity between about 16% and about 30%; and
wherein the post-consumer recycled thermoplastic is selected from the group consisting of poly(ethylene terephthalate), polycarbonate, and polyethylene naphthalate.

87. An anchorable mine support for anchoring in a borehole with resin or grout, comprising:
an elongate metal member with a head disposed at a first end; and
a coating comprising thermoplastic disposed on the member, the thermoplastic having a portion with a thickness of at least about 1 mm and forming a textured outer surface on the metal member;
wherein the coating comprises a first layer with a thickness at least about 0.1 mm and a crystallinity between about 16% and about 30%; and
wherein the thermoplastic is selected from the group consisting of poly(ethylene terephthalate), polycarbonate, and polyethylene naphthalate; and
wherein the textured outer surface comprises at least one protruding inclined surface.

88. The mine support of claim 87, wherein the thermoplastic is post-consumer recycled thermoplastic.

89. The mine support of claim 87, wherein the thermoplastic is post-consumer recycled poly(ethylene terephthalate).

90. The mine support of claim 87, wherein the thermoplastic is post-consumer recycled polycarbonate.

91. The mine support of claim 87, wherein:
the coating further comprises filler incorporated in the thermoplastic; and
the filler is selected from the group consisting of silicon dioxide, limestone, cement, and fly ash.

92. The mine support of claim 87, wherein the first layer contacts the elongate metal member.

93. The mine support of claim 87, wherein the coating comprises a first polymer having a first melt flow rate and a second polymer having a second melt flow rate at least 10% less than the first melt flow rate at about 270° C.

94. The mine support of claim 87, wherein the coating comprises an inhomogeneous mixture of (1) a first a first polymer selected from the group consisting of poly(ethylene terephthalate) and polycarbonate and (2) a second polymer selected from the group consisting of polyethylene and polypropylene.

95. An anchorable mine support for anchoring in a borehole with resin or grout, comprising:

an elongate metal member comprising a first end with a head disposed thereon and a second end remote from the head; and a coating comprising post-consumer recycled thermoplastic disposed on the member, the thermoplastic having a portion with a thickness of at least about 1 mm;

wherein the thermoplastic is selected from the group consisting of poly(ethylene terephthalate), polycarbonate, and polyethylene naphthalate; and wherein the coating is configured and dimensioned with a taper so that the coating is thicker at the second end remote from the head and comparatively thinner at the first end with the head.

96. The mine support of claim 95, wherein the thermoplastic is post-consumer recycled thermoplastic.

97. The mine support of claim 95, wherein the thermoplastic is post-consumer recycled poly(ethylene terephthalate).

98. The mine support of claim 95, wherein the thermoplastic is post-consumer recycled polycarbonate.

* * * * *